United States Patent
Lee et al.

(10) Patent No.: US 11,350,272 B2
(45) Date of Patent: May 31, 2022

(54) ENCRYPTING NETWORK SLICE SELECTION ASSISTANCE INFORMATION

(71) Applicant: QUALCOMM Incorporated, San Diego, CA (US)

(72) Inventors: Soo Bum Lee, San Diego, CA (US); Adrian Edward Escott, Reading (GB); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/669,372

(22) Filed: Oct. 30, 2019

(65) Prior Publication Data

US 2020/0145818 A1    May 7, 2020

Related U.S. Application Data

(60) Provisional application No. 62/754,449, filed on Nov. 1, 2018.

(51) Int. Cl.
    *H04W 12/037*    (2021.01)
    *H04W 60/00*     (2009.01)
    *H04L 9/08*      (2006.01)

(52) U.S. Cl.
    CPC ......... *H04W 12/037* (2021.01); *H04L 9/0819* (2013.01); *H04L 9/0869* (2013.01); *H04W 60/00* (2013.01); *H04L 2209/80* (2013.01)

(58) Field of Classification Search
    CPC .................................................. H04W 12/0017
    See application file for complete search history.

(56) References Cited

U.S. PATENT DOCUMENTS

| 2013/0097284 A1* | 4/2013 | Bai ................... H04W 12/0013 709/217 |
| 2015/0043732 A1* | 2/2015 | Resch ................. G06F 11/1076 380/46 |

(Continued)

FOREIGN PATENT DOCUMENTS

| WO | WO-2018008980 A1 | 1/2018 |
| WO | WO-2018079690 A1 | 5/2018 |

OTHER PUBLICATIONS

3rd Generation Partnership Project; Technical Specification Group Services and System Aspects; Study on the Security Aspects of the Next Generation System (Release 14), 3GPP Standard; S3-172095, Technical Report; 3GPP TR 33.899, 3rd Generation Partnership Project (3GPP), Mobile Competence Centre; 650, Route Des Lucioles; F-06921 Sophia-Antipolis Cedex; France, vol. SA WG3, No. v1.3.0, Aug. 21, 2017, 605 pages, XP051450230,Retrieved from the Internet: URL: http://www.3gpp.org/ftp/tsg_sa/WG3_Security/TSGS3_88_Dali/Docs/[retrieved on Aug. 21, 2017] the whole document.

(Continued)

*Primary Examiner* — Simon P Kanaan
(74) *Attorney, Agent, or Firm* — Holland & Hart LLP

(57) ABSTRACT

Methods, systems, and devices for wireless communications are described. A user equipment (UE) may participate in a registration procedure with an access and mobility management function (AMF). The UE may transmit to the AMF, as part of the registration procedure, an indication of one or more single network slice selection assistance information (S-NSSAI) or a network slice selection assistance information (NSSAI). Following, the UE may receive a control message from the AMF, wherein the control message includes one or more encrypted S-NSSAI values or an encrypted NSSAI value based on the indication. The UE (Continued)

may then transmit the encrypted S-NSSAI or the encrypted NSSAI to a base station as part of a message.

30 Claims, 22 Drawing Sheets

(56) References Cited

U.S. PATENT DOCUMENTS

| | | | | |
|---|---|---|---|---|
| 2015/0082406 A1* | 3/2015 | Park | ............ | H04L 63/0815 |
| | | | | 726/9 |
| 2019/0364541 A1 | 11/2019 | Ryu | | |
| 2020/0092727 A1* | 3/2020 | Basu Mallick | ....... | H04L 1/0061 |
| 2020/0120580 A1* | 4/2020 | Jin | ............ | H04W 48/02 |

OTHER PUBLICATIONS

International Search Report and Written Opinion—PCT/US2019/059040—ISA/EPO—dated Feb. 6, 2020.

* cited by examiner

ENCRYPTING NETWORK SLICE SELECTION ASSISTANCE INFORMATION

CROSS REFERENCE

The present application for patent claims the benefit of U.S. Provisional Patent Application No. 62/754,449 by LEE et al., entitled "PROTECTING NETWORK SLICE SELECTION ASSISTANCE INFORMATION," filed Nov. 1, 2018, assigned to the assignee hereof, and which is expressly incorporated by reference herein.

BACKGROUND

The following relates generally to wireless communications, and more specifically to encrypting network slice selection assistance information (NSSAI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, communications may be protected. Protected communications may include communications that contain private or confidential information. However, some types of communications may lack protection or security. In particular, messages communicated before security algorithms have been agreed upon between a UE and base station may lack adequate protection. As another example, messages for establishing communication may also lack adequate security. Unprotected access stratum (AS) and non-access stratum messages, and in particular, those used to attach a UE to a network, may be examples of such unprotected communications. Unprotected communications may be subject to exploitation by attackers, for example.

SUMMARY

A user equipment (UE) may perform a connection procedure (e.g., a registration procedure, a radio resource control (RRC) connection establishment procedure) with either or both a base station and an access and mobility management function (AMF). For example, as part of the connection procedure, the UE may transmit an indication of single network slice selection assistance information (S-NSSAI) or network slice selection assistance information (NSSAI), which may be a list of S-NSSAIs. Either or both the S-NSSAI and NSSAI may be relayed from the UE to the AMF through the base station. Each S-NSSAI may be associated with a network slice related to a session (e.g., a subscription service). In some examples, this information—S-NSSAI—among other information relevant to the connection procedure, may be referred to herein as private information. In some examples, private information such as, the S-NSSAI or NSSAI may be provided in a non-access stratum message, which may protect the information. However, in some examples, the private information such as the S-NSSAI or NSSAI may be exchanged before an access stratum (AS) security procedure. That is, the private information may be unprotected. As a result, the UE may be susceptible to a security threat (e.g., identification of service(s) that the UE is accessing and/or identification of the UE based on service identification). To reduce security threats, since private information may be exchanged as part of the connection procedure before an AS security setup procedure, the private information may be encrypted using a shared key and an encryption scheme, for example.

A method of wireless communications at a UE is described. The method may include participating in a registration procedure with an AMF, transmitting to the AMF, as part of the registration procedure, an indication of one or more single network slice selection assistance information or a network slice selection assistance information, receiving a control message from the AMF, where the control message includes one or more encrypted single network slice selection assistance information values or an encrypted network slice selection assistance information value based on the indication, and transmitting the encrypted one or more single network slice selection assistance information values or the encrypted network slice assistance information value to a base station as part of a message.

An apparatus for wireless communications is described. The apparatus may include a processor, memory in electronic communication with the processor, and instructions stored in the memory. The instructions may be executable by the processor to cause the apparatus to participate in a registration procedure with an AMF, transmit to the AMF, as part of the registration procedure, an indication of one or more single network slice selection assistance information or a network slice selection assistance information, receive a control message from the AMF, where the control message includes one or more encrypted single network slice selection assistance information values or an encrypted network slice selection assistance information value based on the indication, and transmit the encrypted one or more single network slice selection assistance information values or the encrypted network slice assistance information value to a base station as part of a message.

Another apparatus for wireless communications is described. The apparatus may include means for participating in a registration procedure with an AMF, transmitting to the AMF, as part of the registration procedure, an indication of one or more single network slice selection assistance information or a network slice selection assistance information, receiving a control message from the AMF, where the control message includes one or more encrypted single network slice selection assistance information values or an encrypted network slice selection assistance information value based on the indication, and transmitting the encrypted one or more single network slice selection assistance information values or the encrypted network slice assistance information value to a base station as part of a message.

A non-transitory computer-readable medium storing code for wireless communications at a UE is described. The code may include instructions executable by a processor to participate in a registration procedure with an AMF, transmit to the AMF, as part of the registration procedure, an indication of one or more single network slice selection assistance information or a network slice selection assistance information, receive a control message from the AMF, where the control message includes one or more encrypted single network slice selection assistance information values or an encrypted network slice selection assistance information value based on the indication, and transmit the encrypted one or more single network slice selection assistance information values or the encrypted network slice assistance information value to a base station as part of a message.

A method of wireless communications at an AMF is described. The method may include encrypting one or more single network slice selection assistance information values or a network slice selection assistance information value using a security key, where the one or more single network slice selection assistance information values or the network slice selection assistance information value includes an indication of one or more network slices accessible to a UE, transmitting, to the UE, a control message that includes the one or more encrypted single network slice selection assistance information values or the encrypted network slice selection assistance information value, and transmitting the security key to a base station so that the base station is enabled to decrypt the one or more encrypted single network slice selection assistance information values or the encrypted network slice selection assistance information value upon receipt from the UE.

An apparatus for wireless communications is described. The apparatus may include a processor, memory in electronic communication with the processor, and instructions stored in the memory. The instructions may be executable by the processor to cause the apparatus to encrypt one or more single network slice selection assistance information values or a network slice selection assistance information value using a security key, where the one or more single network slice selection assistance information values or the network slice selection assistance information value includes an indication of one or more network slices accessible to a UE, transmit, to the UE, a control message that includes the one or more encrypted single network slice selection assistance information values or the encrypted network slice selection assistance information value, and transmit the security key to a base station so that the base station is enabled to decrypt the one or more encrypted single network slice selection assistance information values or the encrypted network slice selection assistance information value upon receipt from the UE.

Another apparatus for wireless communications is described. The apparatus may include means for encrypting one or more single network slice selection assistance information values or a network slice selection assistance information value using a security key, where the one or more single network slice selection assistance information values or the network slice selection assistance information value includes an indication of one or more network slices accessible to a UE, transmitting, to the UE, a control message that includes the one or more encrypted single network slice selection assistance information values or the encrypted network slice selection assistance information value, and transmitting the security key to a base station so that the base station is enabled to decrypt the one or more encrypted single network slice selection assistance information values or the encrypted network slice selection assistance information value upon receipt from the UE.

A non-transitory computer-readable medium storing code for wireless communications at an AMF is described. The code may include instructions executable by a processor to encrypt one or more single network slice selection assistance information values or a network slice selection assistance information value using a security key, where the one or more single network slice selection assistance information values or the network slice selection assistance information value includes an indication of one or more network slices accessible to a UE, transmit, to the UE, a control message that includes the one or more encrypted single network slice selection assistance information values or the encrypted network slice selection assistance information value, and transmit the security key to a base station so that the base station is enabled to decrypt the one or more encrypted single network slice selection assistance information values or the encrypted network slice selection assistance information value upon receipt from the UE.

A method of wireless communications at an AMF is described. The method may include generating a random number associated with a UE identifier, generating a second security key using a first security key and a random number, where the first security key is a master key, and the second security key is associated with a UE of the UE identifier, and transmitting the second security key to the UE so that the UE is enabled to encrypt single network slice selection assistance information or network slice selection assistance information.

An apparatus for wireless communications is described. The apparatus may include a processor, memory in electronic communication with the processor, and instructions stored in the memory. The instructions may be executable by the processor to cause the apparatus to generate a random number associated with a UE identifier, generate a second security key using a first security key and a random number, where the first security key is a master key, and the second security key is associated with a UE of the UE identifier, and transmit the second security key to the UE so that the UE is enabled to encrypt single network slice selection assistance information or network slice selection assistance information.

Another apparatus for wireless communications is described. The apparatus may include means for generating a random number associated with a UE identifier, generating a second security key using a first security key and a random number, where the first security key is a master key, and the second security key is associated with a UE of the UE identifier, and transmitting the second security key to the UE so that the UE is enabled to encrypt single network slice selection assistance information or network slice selection assistance information.

A non-transitory computer-readable medium storing code for wireless communications at an AMF is described. The code may include instructions executable by a processor to generate a random number associated with a UE identifier, generate a second security key using a first security key and a random number, where the first security key is a master key, and the second security key is associated with a UE of the UE identifier, and transmit the second security key to the UE so that the UE is enabled to encrypt single network slice selection assistance information or network slice selection assistance information.

A method of wireless communications at a base station is described. The method may include receiving, from an AMF, a security key, receiving a control message from a UE, where the control message includes one or more encrypted single network slice selection assistance information values or an encrypted network slice selection assistance information value having an indication of one or more network slices accessible to the UE in wireless communication with the base station, and decrypting the one or more encrypted single network slice selection assistance information values or the encrypted network slice selection assistance information value in the control message using the security key.

An apparatus for wireless communications is described. The apparatus may include a processor, memory in electronic communication with the processor, and instructions stored in the memory. The instructions may be executable by the processor to cause the apparatus to receive, from an AMF, a security key, receive a control message from a UE, where the control message includes one or more encrypted single network slice selection assistance information values or an encrypted network slice selection assistance information value having an indication of one or more network slices accessible to the UE in wireless communication with the apparatus, and decrypt the one or more encrypted single network slice selection assistance information values or the encrypted network slice selection assistance information value in the control message using the security key.

Another apparatus for wireless communications is described. The apparatus may include means for receiving, from an AMF, a security key, receiving a control message from a UE, where the control message includes one or more encrypted single network slice selection assistance information values or an encrypted network slice selection assistance information value having an indication of one or more network slices accessible to the UE in wireless communication with the apparatus, and decrypting the one or more encrypted single network slice selection assistance information values or the encrypted network slice selection assistance information value in the control message using the security key.

A non-transitory computer-readable medium storing code for wireless communications at a base station is described. The code may include instructions executable by a processor to receive, from an AMF, a security key, receive a control message from a UE, where the control message includes one or more encrypted single network slice selection assistance information values or an encrypted network slice selection assistance information value having an indication of one or more network slices accessible to the UE in wireless communication with the base station, and decrypt the one or more encrypted single network slice selection assistance information values or the encrypted network slice selection assistance information value in the control message using the security key.

DETAILED DESCRIPTION

Figure 1:
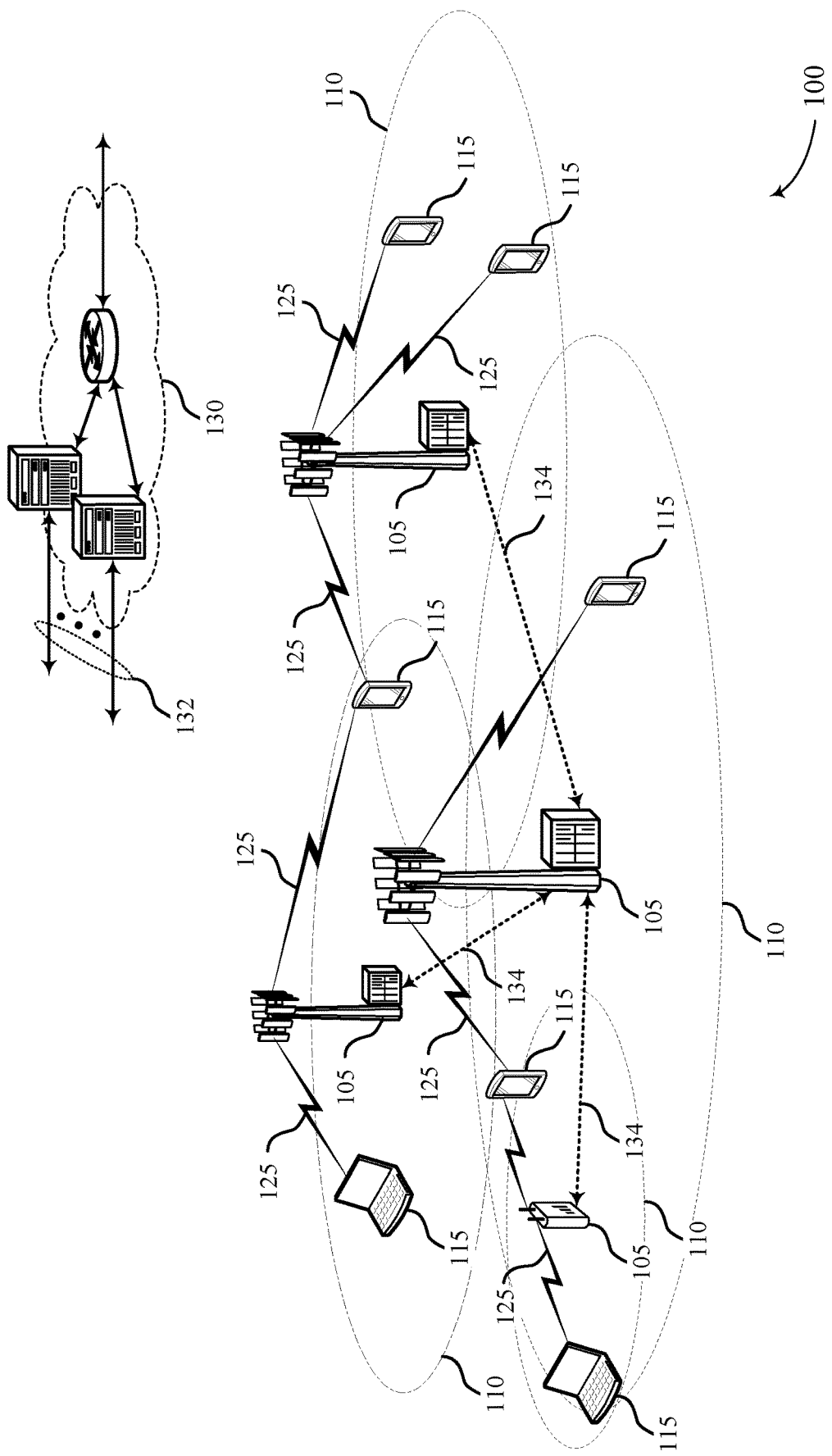
FIGS. 1 and 2 illustrate examples of a wireless communications system that supports encrypting network slice selection assistance information (NSSAI) in accordance with aspects of the present disclosure.

A base station and a user equipment (UE) may perform a connection procedure, for example, such as a radio resource control (RRC) connection procedure. As part of the RRC connection procedure, both the base station and UE may exchange multiple messages. In some examples, the messages, however, may be susceptible to interception by another communication device (e.g., another UE or base station) and pose security challenges for the base station and UE. Although some techniques to protect the exchange of messages after an access stratum (AS) security procedure are established, there may be elements of the messages containing information that is unprotected and important in the connection procedure. Eliminating the information from the messages, however, may result in connection setup latency. The described techniques herein may therefore provide improvements in securing information in messages exchanged as part of a connection procedure. For example, to eliminate or reduce security threats related to the connection procedure, an access and mobility management function (AMF) may provision either or both the UE and base station with information, which may be used to encrypt and decrypt the private information.

An AMF may encrypt one or more single network slice selection assistance information (S-NSSAI) values or a network slice selection assistance information (NSSAI) value using a security key. For example, the AMF may encrypt one or more S-NSSAI values or an NSSAI value using a security key. The security key may be shared between the AMF and either or both a UE and a base station in wireless communications with the UE. The security key may be based in part on a key derivation parameter (e.g., a random number, an identifier, a globally unique temporary identifier) and a master key known by the AMF and by the base station. The master key may be associated with decrypting the one or more encrypted S-NSSAI values or the encrypted NSSAI value. That is, the AMF and base station may use a same encryption and decryption scheme (e.g., algorithm). In addition, when the UE is provided with the shared security key the UE may also use the encryption and decryption scheme.

The S-NSSAI values or the NSSAI value may be an indication of one or more network slices accessible to the UE. The AMF may transmit, to the UE, a control message that includes the one or more encrypted S-NSSAI values or the NSSAI value, which the UE may transmit (e.g., forward) to the base station when the UE attempts to connect to the base station in idle mode. The base station may decrypt the one or more encrypted S-NSSAI values or the NSSAI value using the shared security key. As an alternative solution, and to decrease security risks related to the connection procedure, the base station may decrypt the one or more encrypted S-NSSAI values or the NSSAI value using a different security key generated by the base station based in part on the shared security key and a random number or a temporary identifier, or both.

Particular aspects of the subject matter described herein may be implemented to realize one or more advantages. The described techniques may support improvements in securing and protecting communications, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are then described in the context of a process flow. Aspects of the disclosure are further illustrated by and described with reference to apparatus diagrams, system diagrams, and flowcharts that relate to encrypting NSSAI.

FIG. 1 illustrates an example of a wireless communications system 100 that supports encrypting NSSAI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 (e.g., gNodeB (gNB)) may perform a connection procedure with a UE 115. For example, the connection procedure may be a radio resource control (RRC) connection establishment procedure. As part of the RRC connection establishment procedure, both the base station 105 and UE 115 may communicate messages, which may contain private information. For example, the private information may contain one or more S-NSSAI values or a list of S-NSSAI values, among other information applicable to the RRC connection establishment procedure. In some examples, the private information may be exchanged as part of an access stratum (AS) security procedure. For example, initial non-access stratum messages of the AS security procedure may provide protection for the private information.

In some examples, however, the private information may be exchanged before an access stratum (AS) security procedure. In this case, the information may be unprotected. As a result, either or both the base station 105 and UE 115 may be susceptible to a security risk (e.g., identification of service(s) that the UE 115 is accessing and/or identification of the UE 115 based on service identification by another base station 105 or UE 115). In some examples, the private information may include one or more S-NSSAI values or a list of S-NSSAI values that may be ciphered when the UE 115 transmits it to an AMF residing in the core network 130. If the UE 115 has a security context, the one or more S-NSSAI values or the list of S-NSSAI values may be ciphered (i.e., included in ciphertext in an information element (IE) of a control message). Otherwise, if the UE 115 does not have a security context, the one or more S-NSSAI values or the list of S-NSSAI values may be included in a non-access stratum message, upon authentication of the UE 115.

For example, the base station 105 may receive one or more S-NSSAI values or a list of S-NSSAI values in an RRC message (e.g., in an RRC setup complete message (RRC-message5)) for AMF selection. If the private information (e.g., the one or more S-NSSAI values or the list of S-NSSAI values) is removed from the RRC message, the base station 105 may be unable to select an AMF that can handle a network slice based at least in part on an S-NSSAI value, in case of AMF relocation. This may also result in connection setup latency for the UE 115. To decrease security risks related to the connection procedure and eliminate avoidable connection setup latency, the private information may be encrypted as part of the RRC message, and either or both the base station 105 and UE 115 may be capable of encrypting and decrypting the private information, as described herein.

Figure 2:
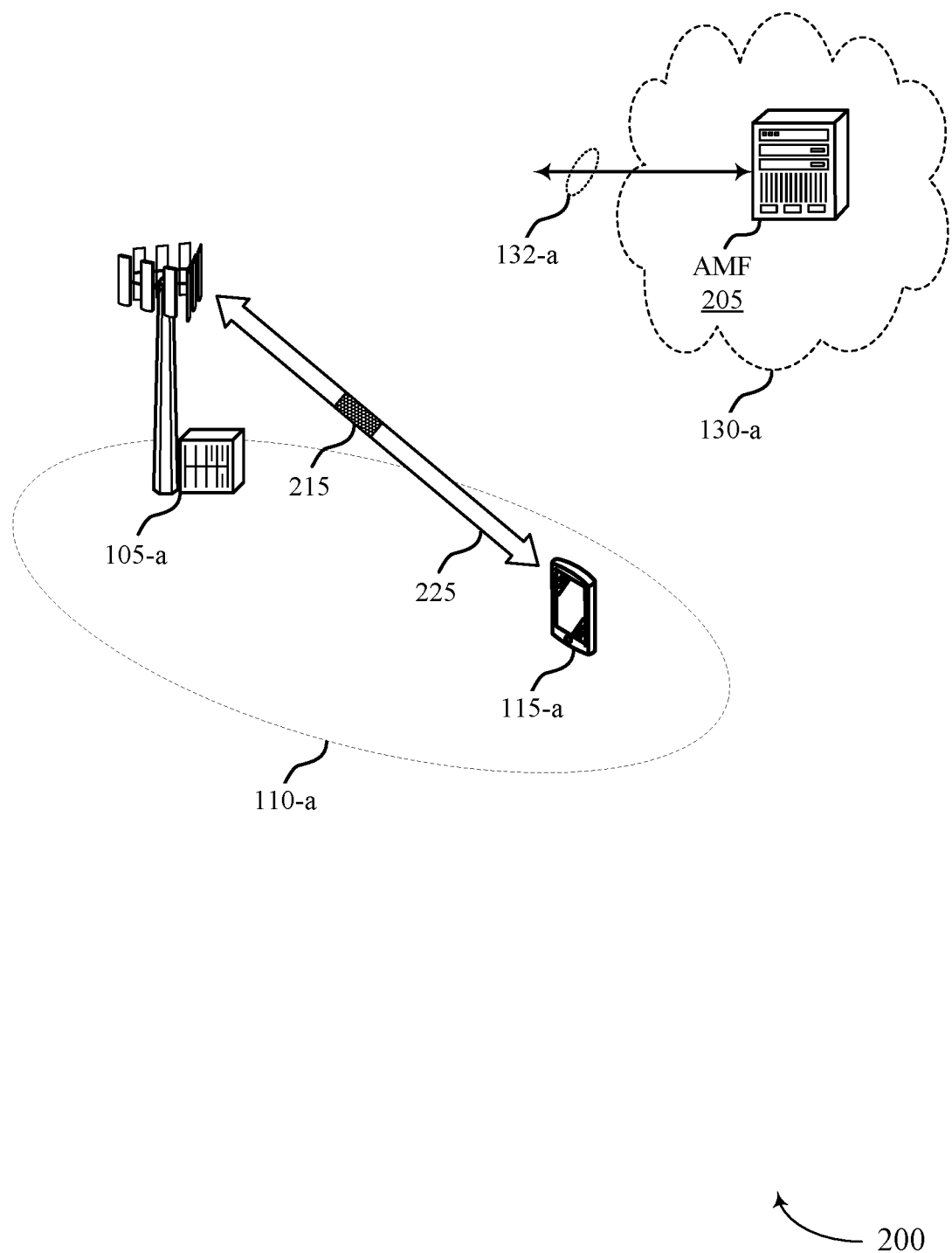

FIG. 2 illustrates an example of a wireless communications system 200 that supports encrypting NSSAI in accordance with aspects of the present disclosure. The wireless communications system 200 may include a base station 105-a and a UE 115-a, which may be examples of the corresponding devices described with reference to FIG. 1. In some examples, the wireless communications system 200 may also include an AMF 205, which may be examples of the corresponding devices described with reference to FIG. 1. For example, the AMF 205 may be part of a core network 130-a, which may be an example of a core network described with reference to FIG. 1. The wireless communications system 200 may include others functions or devices not shown, or may not include one or more of the functions or devices shown. In some examples, the AMF 205 may have PKG functionality. Alternatively, the wireless communications system 200 may include a PKG that may be a separate function or device that may provide information (e.g., identity-based cryptography information) to the AMF 205.

The wireless communications system 200 may also implement aspects of the wireless communications system 100. For example, the base station 105-a, the UE 115-a, or the AMF 205, or a combination thereof may support security procedures to protect private information (e.g., NSSAI) and reduce probabilities of other communication devices from obtaining the private information. The base station 105-a may communicate with the UE 115-a within a coverage area 110-a, and the AMF 205 may communicate with either or both the base station 105-a and UE 115-a via communication link 132-a (e.g., via an S1, N2, N3, or other interface).

The AMF 205 may encrypt the one or more S-NSSAI values or NSSAI for decryption by either or both the base station 105-a and UE 115-a. For example, the AMF 205 may encrypt one or more S-NSSAI values or an NSSAI value using a security key. The security key may be a shared between the AMF 205 and either or both the base station 105-a and UE 115-a. The security key may be based in part on a key derivation parameter and a master key known by the AMF 205 and by the base station 105-a. The key derivation parameter may include a random number, a temporary identifier (e.g., a global unique temporary identifier), or a combination thereof. The master key may be associated with decrypting the one or more encrypted S-NSSAI values or the encrypted NSSAI value.

The S-NSSAI or NSSAI may include information related to one or more network slices supportable by the AMF 205, and accessible to the UE 115-a. Following the encryption of the one or more S-NSSAI values or NSSAI, the AMF 205 may transmit the encrypted S-NSSAI values or the encrypted NSSAI value to the UE 115-a so that the UE 115-a transmits the encrypted S-NSSAI values or the encrypted NSSAI value at an RRC layer to the base station 105-a. The base station 105-a may decrypt the encrypted S-NSSAI values or the encrypted NSSAI value to obtain the S-NSSAI values or NSSAI value. In some examples, the obtained S-NSSAI values or NSSAI value may not be the same S-NSSAI values or NSSAI value that the base station 105-a may select for the UE 115-a. That is, the obtained S-NSSAI values or NSSAI value may be used for routing (e.g., from the AMF 205 to the base station 105-a through UE 115-a) and not necessarily network slice selection for the UE 115-a.

In some examples, the AMF 205 may encrypt the one or more S-NSSAI values or NSSAI value based in part on preparing an encryption packet that includes the one or more encrypted S-NSSAI values or the encrypted NSSAI value, and an indication of the security key and an encryption function (also referred to herein as encryption and decryption scheme) associated with the encrypting of the one or more S-NSSAI values or the NSSAI value. The indication may include a set of bits in the encryption packet. For example, a format for the encryption packet may include a first set of bits for an identifier (e.g., an 8 bit identifier), a second set of bits for a key derivation parameter (e.g., 40 bit random number), and a third set of bits that may represent the encrypted S-NSSAI or encrypted NSSAI (e.g., 32 bit encrypted S-NSSAI). In some examples, the first set of bits for an identifier may be an indication of the security key and the encryption function used to protect the S-NSSAI. The second set of bits for the key derivation parameter may be such that the encrypted S-NSSAIs are distinguished from encrypted S-NSSAIs for different UEs. By way of example, the AMF 205 may encrypt the S-NSSAI according to the following expression, for example: e(K r)⊕S-NSSAI, where e( ) is an encryption function/algorithm, K may be a security key, r may be a key derivation parameter and ⊕ is the exclusive OR operation, and S-NSSAI is the unencrypted S-NSSAI. In some examples, the function e( ) may be indicated by the first set of bits. Alternatively, to form the encrypted S-NSSAI, a set of indexes may be used. Each index value of the set may be related (e.g., point to) a particular S-NSSAI. As such, the encrypted S-NSSAI for an S-NSSAI may be any value that satisfies the following expression h(encrypted S-NSSAI)=an index value of the S-NSSAI, where h( ) is a hash function. In some examples, additional inputs to the hash function may be used such as, for example, a user identity (e.g., a global unique temporary identifier, or a key (e.g., a security key, a temporary key, a public key)).

Upon receiving the encrypted S-NSSAI or encrypted NSSAI, the UE 115-a may transmit (forward) the encrypted S-NSSAI or encrypted NSSAI to the base station 105-a as part of a message 215. For example, the base station 105-a may perform a connection procedure (e.g., an RRC procedure, such as a cell acquisition procedure, a random access procedure, an RRC connection establishment procedure, an RRC configuration procedure) with the UE 115-a. The UE 115-a may transmit the encrypted S-NSSAI or encrypted NSSAI to the base station 105-a in a control message (e.g., a connection setup complete message) as part of the connection procedure, while the UE 115-a is in idle mode. In some examples, the UE 115-a may transmit the encrypted S-NSSAI or encrypted NSSAI to the base station 105-a without decrypting the encrypted S-NSSAI or encrypted NSSAI. As such, the UE 115-a may obtain encrypted S-NSSAI or encrypted NSSAI from the AMF 205. In this case, the UE 115-a may simply provide the encrypted S-NSSAI or encrypted NSSAI to the base station 105-a, which the base station 105-a may decrypt the encrypted S-NSSAI or encrypted NSSAI to identify the S-NSSAIs or NSSAIs.

In some examples, the UE 115-a may obtain a UE specific encryption key (e.g., a security key) from the AMF 205. In this case, the UE 115-a may encrypt the S-NSSAIs and provide the encrypted NSSAIs to the base station 105-a. The AMF 205 may derive the UE specific encryption key from the master key and provide the UE specific encryption key to the UE 115-a along with the key derivation parameter (e.g., a random number, global unique temporary identifier). The base station 105-a, when it receives the encrypted S-NSSAI and or the encrypted NSSAI from the UE 115-a, may derive the UE specific encryption key using the master key and the key derivation parameter (provided by the UE 115-a). In some examples, the UE 115-a may add additional network slice information to the one or more encrypted S-NSSAI values or the encrypted NSSAI value, and encrypt both the additional network slice information and the one or more encrypted S-NSSAI values or the encrypted NSSAI value into an expanded encryption packet using the security key. In further examples the AMF 205 may transmit new S-NSSAI to the UE 115-a, and the UE 115-a may encrypt the new S-NSSAI using a second security key.

The new S-NSSAI may be part of an expanded encryption packet. In some examples, the new S-NSSAI may be encrypted using a different security key from the shared security key. For example, the AMF 205 may generate a second security key using the shared security key and a key derivation parameter. The key derivation parameter may be associated with a UE identifier of the UE 115-a, and as such the second security key may be associated with the UE identifier. The AMF 205 may transmit the second security key to the UE 115-a so that the UE 115-a is enabled to encrypt the S-NSSAI or NSSAI. In some examples, the AMF 205 may transmit the second security key in a non-access stratum message to the UE 115-a. The UE 115-a may receive the second security key and a key derivation parameter from the AMF 205. The UE 115-a may then transmit the expanded encryption packet to the base station 105-a. In some examples, the expanded encryption packet may include the key derivation parameter so that the base station 105-a is enabled to generate the second security key and decrypt the expanded encryption packet (e.g., the new S-NSSAI in the expanded encryption packet).

The key derivation parameter may be referred to as "a security key refresh value or a random number" that may allow that each S-NSSAI is encrypted with a different keystream (e.g., different security key). In some examples, the length of the random number may be dynamic (vary). For example, if a key change occurs as part of a global unique temporary identifier reassignment then the length of the random number may be smaller (or fixed for each S-NSSAI) to reduce message overhead. Otherwise, if the random number is static the length of the random number may be a predetermined size (e.g., 32 bits) to ensure protection of the encrypted S-NSSAIs (i.e., such that the encrypted S-NSSAI appear random).

In some examples, the AMF 205 may transmit the S-NSSAI as part of the connection procedure (e.g., performing a cell acquisition procedure, a random access procedure, an RRC connection procedure, an RRC configuration procedure) during initial registration. The encrypted S-NSSAI may be maintained between registrations. If the base station 105-a is absent of the security key, the base station 105-a may select a default AMF (e.g., AMF 205). The default AMF may transmit the security key to the base station 105-a to provide a mechanism to update the base station 105-a as part of the signaling during the connection procedure (as part of the initial registration).

In some examples, either or both encrypted S-NSSAI or encrypted NSSAI may be provided with change of a global unique temporary identifier, and the AMF 205 may include any part of an assigned global unique temporary identifier known to the base station 105-a into the encryption function for encrypting either or both S-NSSAI and NSSAI. For example, the AMF 205 may identify a global unique temporary identifier associated with the UE 115-a, and encrypt the one or more S-NSSAI or the NSSAI value using the global unique temporary identifier associated with the UE 115-a. The AMF 205 may include in the indication the global unique temporary identifier.

Upon receiving the encrypted S-NSSAI or encrypted NSSAI from the UE 115-a, the base station 105-a may decrypt the encrypted S-NSSAI or encrypted NSSAI using the security key shared by the AMF 205. In some examples, the base station 105-a may decrypt the encrypted S-NSSAI or encrypted NSSAI based in part on a different security key. For example, the base station 105-a may generate a second security key using the security key shared by the AMF 205 and a key derivation parameter. The security key may be a master key and the key derivation parameter may be provided by the UE 115-a as part of a message (encryption packet) carrying the encrypted S-NSSAI or encrypted NSSAI. Once the base station 105-a has decrypted the S-NSSAI or NSSAI, the base station 105-a may select one or more network slices for the UE 115-a, and transmit a message indicating the selected network slices to the UE 115-a for the session requested by the UE 115-a.

Accordingly, either or both the bases station 105-a and UE 115-a may support protecting private information (e.g., S-NSSAI) exchanged as part of connection procedure before an AS security is established, to mitigate the capabilities of attackers or other third parties from obtaining the private information. Some benefits of the techniques described herein may include attack mitigation (such as mitigation of denial of service) and privacy enhancement, all of which may be provided with minimal messaging overhead.

Figure 3:
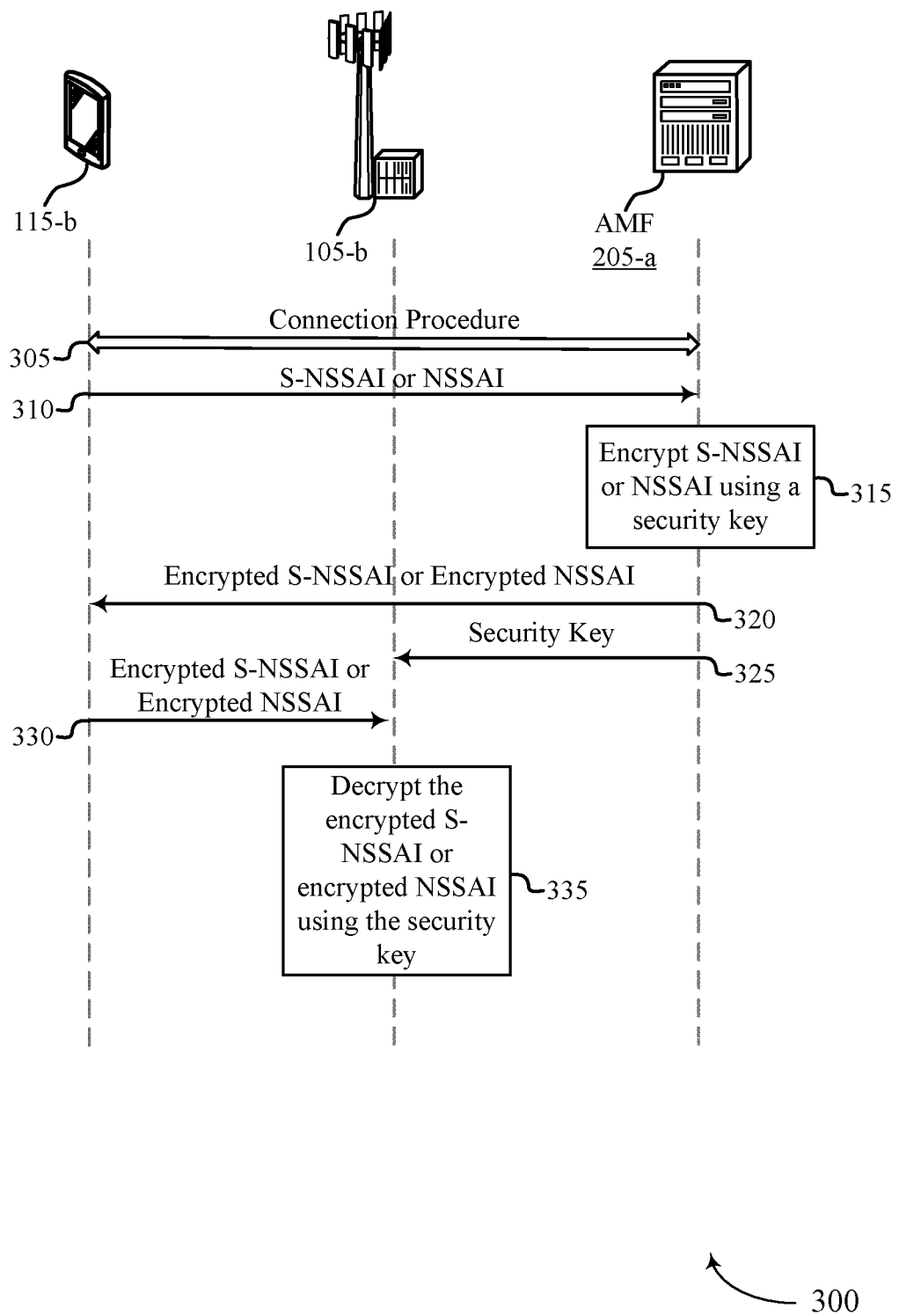
FIG. 3 illustrates an example of a process flow that supports encrypting NSSAI in accordance with aspects of the present disclosure.

FIG. 3 illustrates an example of a process flow 300 that supports encrypting NSSAI in accordance with aspects of the present disclosure. The process flow 300 may include a base station 105-b and a UE 115-b, which may be examples of the corresponding devices described with reference to FIGS. 1 and 2. The process flow 300 may additionally, or alternatively, include an AMF 205-a, which may be examples of the corresponding functions or devices described with reference to FIGS. 1 and 2. In some examples, the process flow 300 may implement aspects of the wireless communications system 100 and 200. For example, the base station 105-b, the UE 115-b, or the AMF 205-a, or a combination thereof may support protecting private information (e.g., NSSAI) exchange as part of a connection procedure including the base station 105-b, the UE 115-b, and the AMF 205-a.

In the following description of the process flow 300, the operations between the base station 105-b, the UE 115-b, and the AMF 205-a, may be transmitted in a different order than the exemplary order shown, or the operations performed by the base station 105-b, the UE 115-b, and the AMF 205-a, may be performed in different orders or at different times. Some operations may also be left out of the process flow 300, or other operations may be added to the process flow 300.

At 305, the process flow 300 may commence with the base station 105-b, the UE 115-b, and the AMF 205 performing a connection procedure (e.g., performing a cell acquisition procedure, a random access procedure, an RRC connection procedure, an RRC configuration procedure, a registration procedure, a RRC connection establishment procedure). In some examples, the entire process flow 300 may be considered a connection procedure. In other examples, process flow 300 may be considered as being comprised of multiple procedures, including a connection procedure. For example, a connection procedure may include aspects of 310, 315, 320, 325, 330, and 335 from process flow 300, and as described below.

A registration procedure may include UE 115-b sending an indication of one or more S-NSSAI or an NSSAI to AMF 205-a (e.g., at 310) and receiving the encrypted one or more S-NSSAI or an NSSAI from AMF 205-a (e.g., at 320). At 310, the UE 115-b may transmit an indication of one or more S-NSSAI or an NSSAI to the AMF 205-a. At 315, the AMF 205-a may encrypt the one or more S-NSSAI or an NSSAI using a security key. At 320, the AMF 205-a may transmit the encrypted one or more S-NSSAI or the encrypted NSSAI to the UE 115-b. At 325, the AMF 205-a may transmit the security key to the base station 105-b, for example, so that the base station 105-b is enabled to decrypt the encrypted one or more S-NSSAI or the encrypted NSSAI. At 330, the UE 115-b may transmit the encrypted one or more S-NSSAI or the encrypted NSSAI to the base station 105-b. At 335, the base station 105-b may decrypt the encrypted one or more S-NSSAI or the encrypted NSSAI using the security key.

In some alternative examples, the UE 115-b may be provisioned with a security key that is based on a key derivation parameter (e.g., a random number, an identifier, a globally unique temporary identifier), and the UE 115-b may encrypt the one or more S-NSSAI or the NSSAI using the security key. In this example, the UE 115-b may include the key derivation parameter in a message (e.g. a control message such as a connection setup complete message as part of the connection procedure) carrying the encrypted S-NSSAI or the encrypted NSSAI, so that the base station 105-b is enabled to generate the security key and decrypt the encrypted S-NSSAI or the encrypted NSSAI. For example, the UE 115-b may obtain a UE specific encryption key (e.g., a security key) from the AMF 205-a. In this case, the UE 115-b may encrypt the S-NSSAIs and provide the encrypted NSSAIs to the base station 105-b. The AMF 205-a may derive the UE specific encryption key from the master key and provide the UE specific encryption key to the UE 115-b along with the key derivation parameter. The base station 105-b, when it receives the encrypted S-NSSAI and or the encrypted NSSAI from the UE 115-b, may derive the UE specific encryption key using the master key and the key derivation parameter (provided by the UE 115-b), and decrypt the encrypted one or more S-NSSAI or the encrypted NSSAI based in part on the UE specific encryption key and a same encryption and decryption scheme used by the UE 115-b.

Accordingly, either or both the bases station 105-b and UE 115-b may support protecting S-NSSAI and NSSAI exchanged before an AS security procedure is established, to mitigate the capabilities of attackers or other third parties from obtaining the S-NSSAI and NSSAI. Some benefits of the techniques described herein may include attack mitigation (such as mitigation of denial of service) and privacy enhancement.

Figure 4:
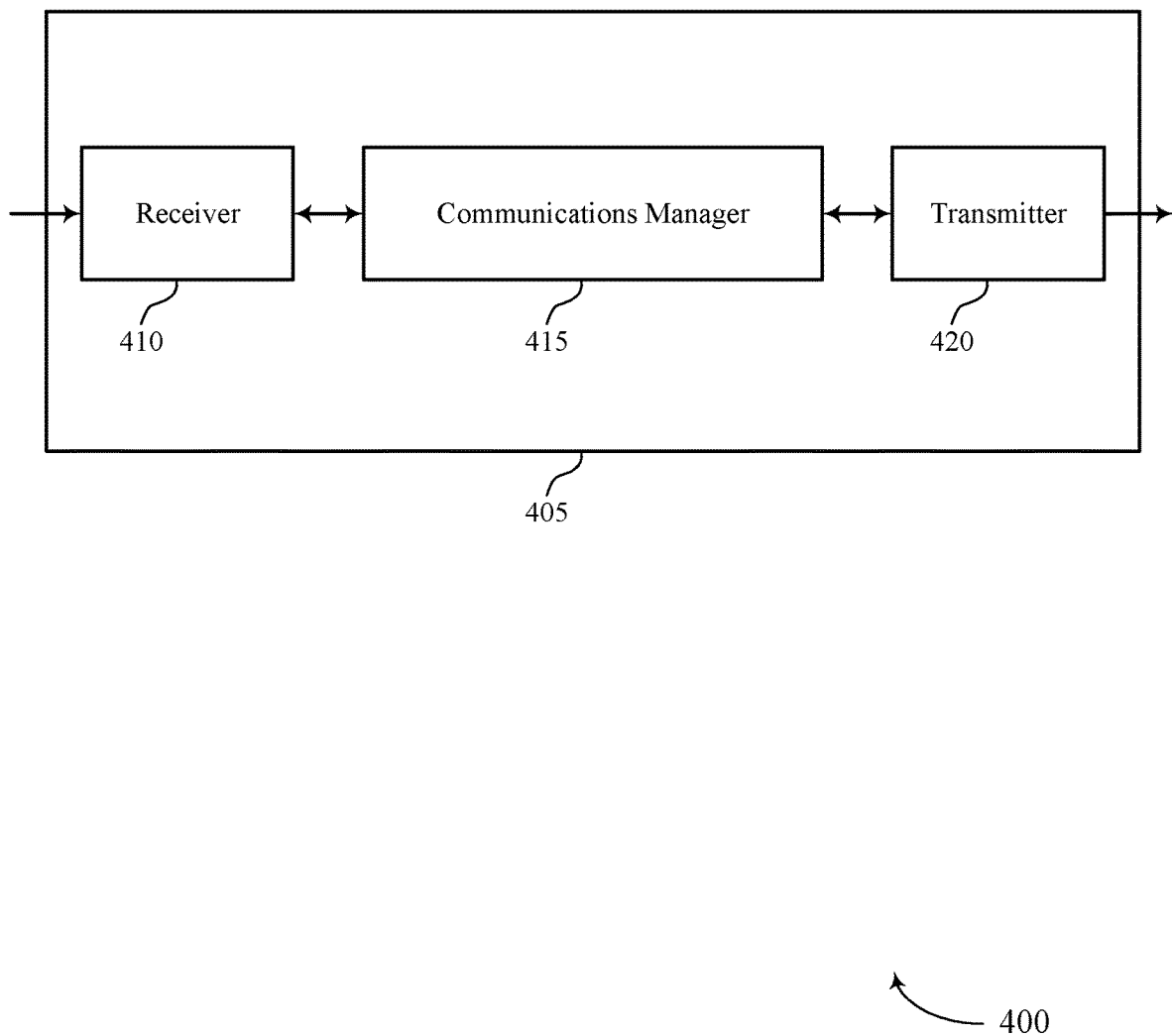
FIGS. 4 and 5 show block diagrams of devices that support encrypting NSSAI in accordance with aspects of the present disclosure.

FIG. 4 shows a block diagram 400 of a device 405 that supports encrypting NSSAI in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to encrypting NSSAI, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may participate in a registration procedure with an AMF, transmit to the AMF, as part of the registration procedure, an indication of one or more S-NSSAI or an NSSAI, receive a control message from the AMF, where the control message includes one or more encrypted S-NSSAI values or an encrypted NSSAI value based on the indication, and transmit the encrypted S-NSSAI or the encrypted network slice assistance information to a base station as part of a message. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to receive a control message which includes one or more encrypted S-NSAAI values or an encrypted NSSAI value and transmit the one or more encrypted S-NSAAI values or the encrypted NSSAI value to a base station as part of a message. This encryption of the S-NSAAI values or the NSSAI value may increase security, protect privacy, increase reliability and reduce latency during communications.

Based on techniques for encrypting S-NSAAI values in a message as described herein, a processor of a UE 115 (e.g., controlling the receiver 410, the transmitter 420, or the transceiver 720 as described with reference to FIG. 7) may increase reliability and decrease signaling overhead in the communication of encrypted messages because the UE 115 may avoid going through unnecessary configuration processes during transmissions.

Figure 5:
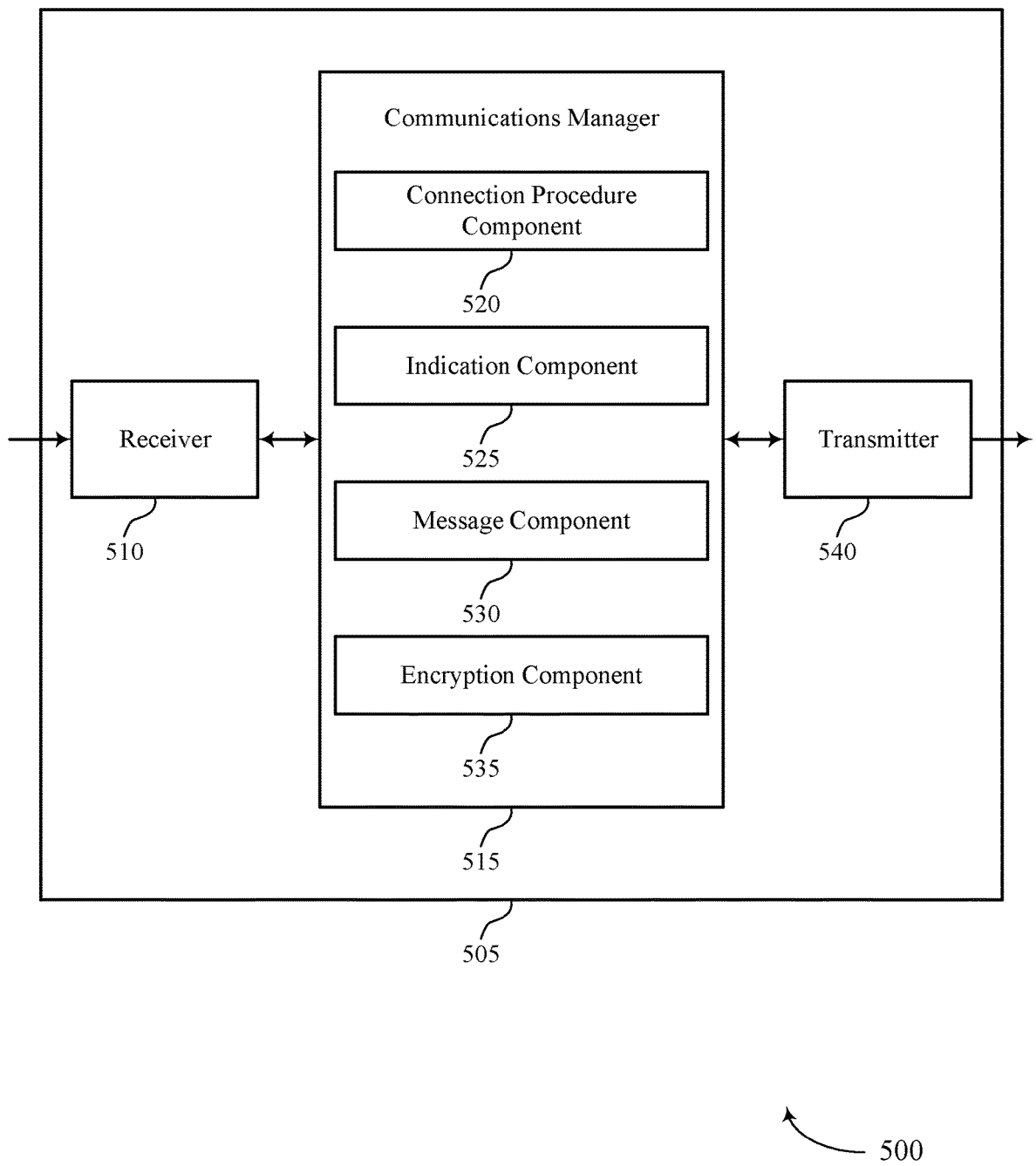

FIG. 5 shows a block diagram 500 of a device 505 that supports encrypting NSSAI in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to encrypting NSSAI, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a connection procedure component 520, an indication component 525, a message component 530, and an encryption component 535. The communications manager 515 may be an example of aspects of the communications manager 710 described herein.

The connection procedure component 520 may participate in a registration procedure with an AMF. The indication component 525 may transmit to the AMF, as part of the registration procedure, an indication of one or more S-NSSAI or an NSSAI. The message component 530 may receive a control message from the AMF, where the control message includes one or more encrypted S-NSSAI values or an encrypted NSSAI value based on the indication. The encryption component 535 may transmit the encrypted S-NSSAI or the encrypted network slice assistance information to a base station as part of a message.

The transmitter 540 may transmit signals generated by other components of the device 505. In some examples, the transmitter 540 may be collocated with a receiver 510 in a transceiver component. For example, the transmitter 540 may be an example of aspects of the transceiver 720 described with reference to FIG. 7. The transmitter 540 may utilize a single antenna or a set of antennas.

In some examples, the communications manager 515 may be implemented as an integrated circuit or chipset for a mobile device modem, and the receiver 510 and transmitter 540 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive a control message which includes one or more encrypted S-NSAAI values or an encrypted NSSAI value and transmit the one or more encrypted S-NSAAI values or the encrypted NSSAI value to a base station as part of a message. This encryption of the S-NSAAI values or the NSSAI value may increase security, protect privacy, increase reliability and reduce latency during communications.

Based on techniques for encrypting S-NSAAI values in a message as described herein, a processor of a UE 115 (e.g., controlling the receiver 510, the transmitter 540, or the transceiver 720 as described with reference to FIG. 7) may increase reliability and decrease signaling overhead in the communication of encrypted messages because the UE 115 may avoid going through unnecessary configuration processes during transmissions.

Figure 6:
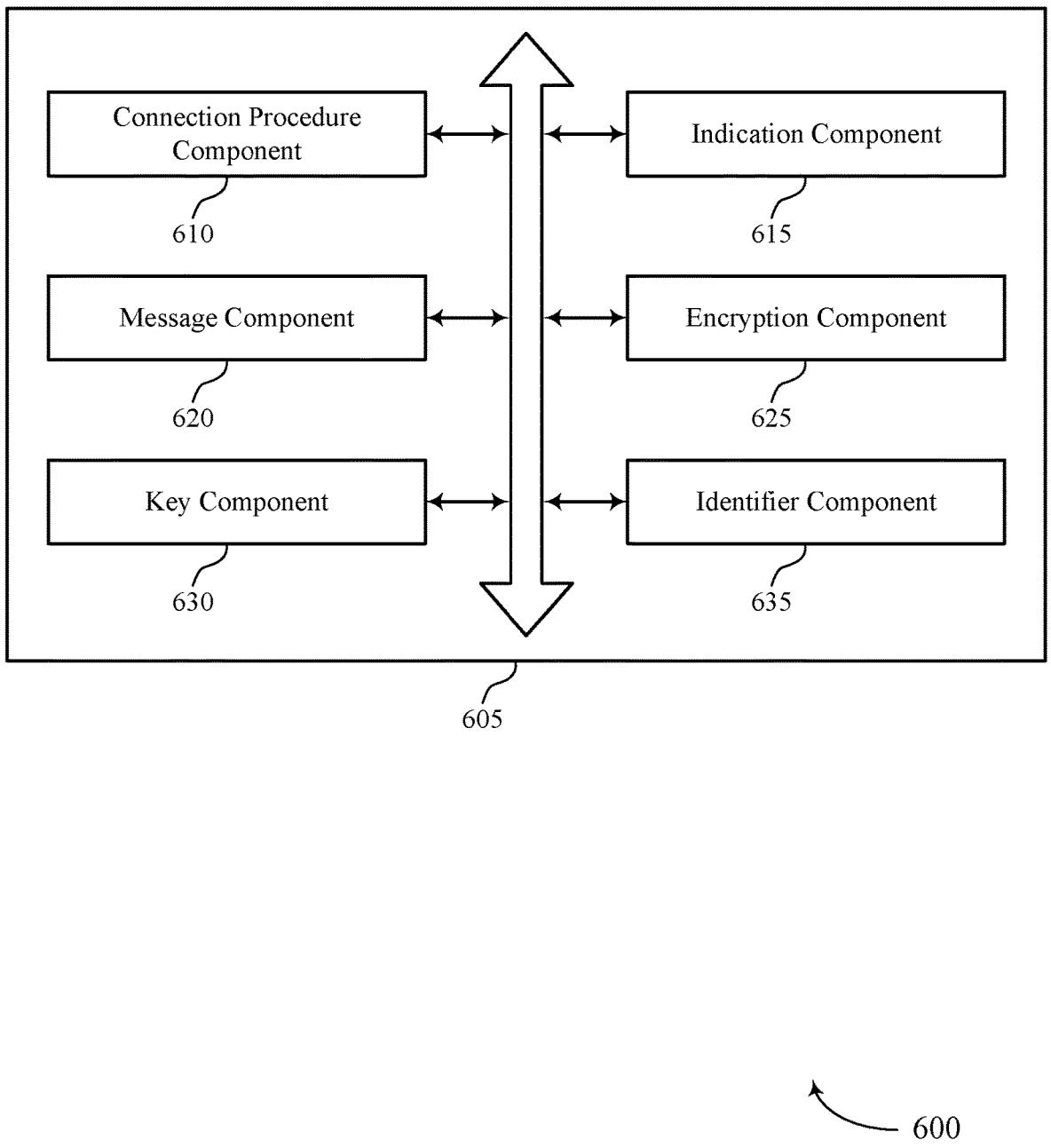
FIG. 6 shows a block diagram of a communications manager that supports encrypting NSSAI in accordance with aspects of the present disclosure.

FIG. 6 shows a block diagram 600 of a communications manager 605 that supports encrypting NSSAI in accordance with aspects of the present disclosure. The communications manager 605 may be an example of aspects of a communications manager 415, a communications manager 515, or a communications manager 710 described herein. The communications manager 605 may include a connection procedure component 610, an indication component 615, a message component 620, an encryption component 625, a key component 630, and an identifier component 635. Each of these components may communicate, directly or indirectly, with one another (e.g., via one or more buses).

The connection procedure component 610 may participate in a registration procedure with an AMF. The indication component 615 may transmit to the AMF, as part of the registration procedure, an indication of one or more S-NSSAI or an NSSAI. In some examples, the indication component 615 may receive new S-NSSAI from the AMF.

The message component 620 may receive a control message from the AMF, where the control message includes one or more encrypted S-NSSAI values or an encrypted NSSAI value based on the indication. In some examples, the message component 620 may identify in the control message an indication associating the one or more encrypted S-NSSAI values or the encrypted NSSAI value with the UE, the indication including a set of bits in an encryption packet of the control message, the encryption packet including the one or more encrypted S-NSSAI values or the encrypted NSSAI value, and where the set of bits includes a random number. In some examples, the message component 620 may identify in the control message an indication of the security key and an encryption function associated with encryption of the encrypted one or more S-NSSAI values or the encrypted NSSAI value, where the indication includes a set of bits in an encryption packet of the control message, the encryption packet including the encrypted one or more S-NSSAI values or the encrypted NSSAI value.

The encryption component 625 may transmit the encrypted S-NSSAI or the encrypted network slice assistance information to a base station as part of a message. In some examples, the encryption component 625 may transmit the encrypted S-NSSAI or the encrypted NSSAI without decrypting the encrypted S-NSSAI or the encrypted NSSAI. In some examples, encrypting both the additional slice information and the one or more encrypted S-NSSAI values or the encrypted NSSAI value into an expanded encryption packet using the security key, where transmitting the encrypted S-NSSAI to the base station includes transmitting the expanded encryption packet.

In some examples, the encryption component 625 may encrypt the new S-NSSAI using a second security key, where the UE receives the second key and a random number from the AMF. In some examples, the encryption component 625 may transmit the encrypted new S-NSSAI to the base station as part of a second control message, where the second control message includes the random number so that the base station is enabled to generate the second security key and decrypt the encrypted new S-NSSAI.

The key component 630 may receive, in the control message, a security key and a random number, where the security key is based on the random number and a master key known by the AMF and by the base station, the master key being associated with decrypting the one or more encrypted S-NSSAI values or the encrypted NSSAI value. In some examples, the key component 630 may add additional network slice information to the one or more encrypted S-NSSAI values or the encrypted NSSAI value. The identifier component 635 may identify a global unique temporary identifier associated with the downlink transmission from the base station on the network slice, where the random number is based on the global unique temporary identifier.

Figure 7:
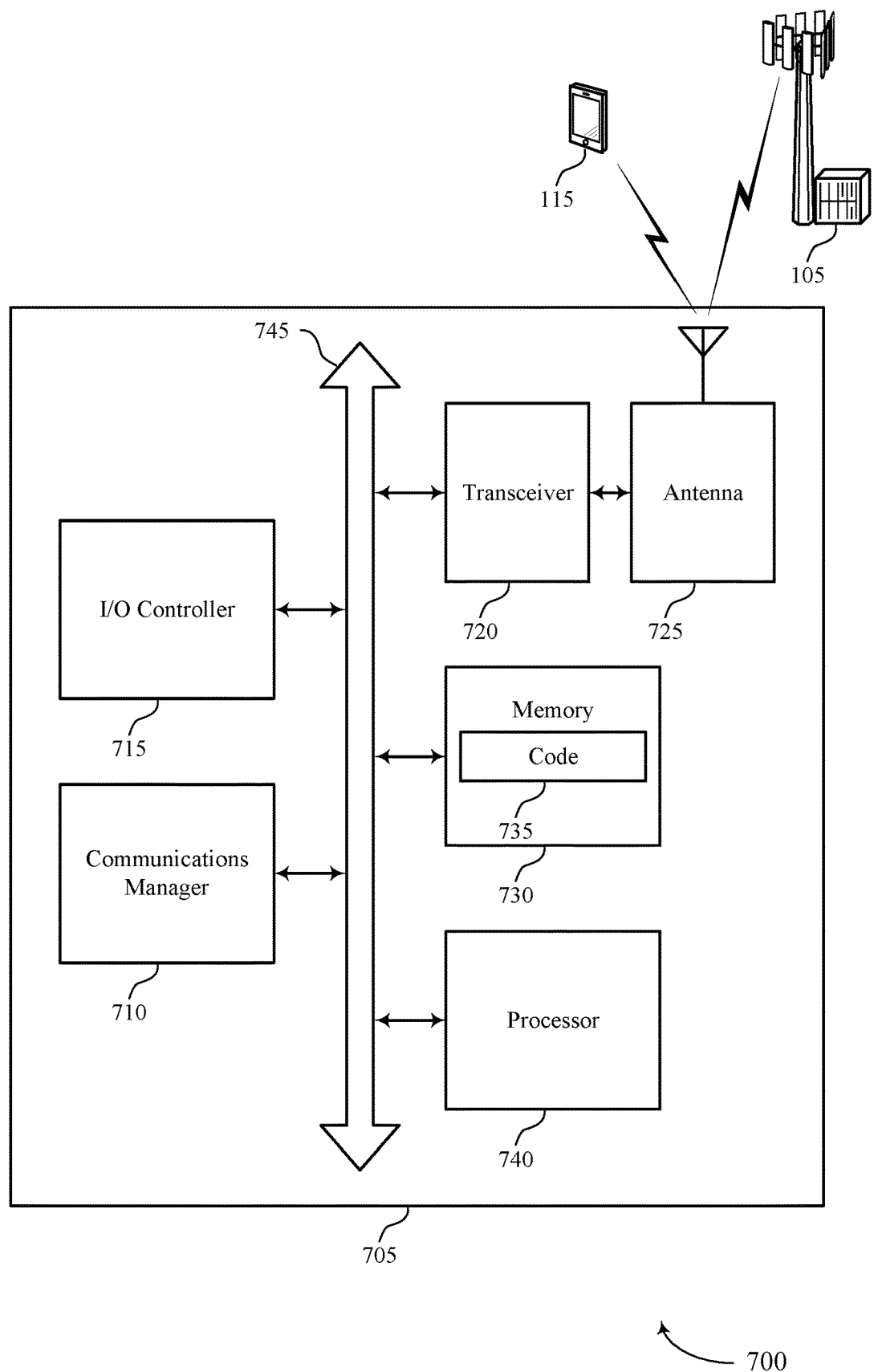
FIG. 7 shows a diagram of a system including a device that supports encrypting NSSAI in accordance with aspects of the present disclosure.

FIG. 7 shows a diagram of a system 700 including a device 705 that supports encrypting NSSAI in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may participate in a registration procedure with an AMF, transmit to the AMF, as part of the registration procedure, an indication of one or more S-NSSAI or an NSSAI, receive a control message from the AMF, where the control message includes one or more encrypted S-NSSAI values or an encrypted NSSAI value based on the indication, and transmit the encrypted S-NSSAI or the encrypted network slice assistance information to a base station as part of a message.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic-input basic-output (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting encrypting NSSAI).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
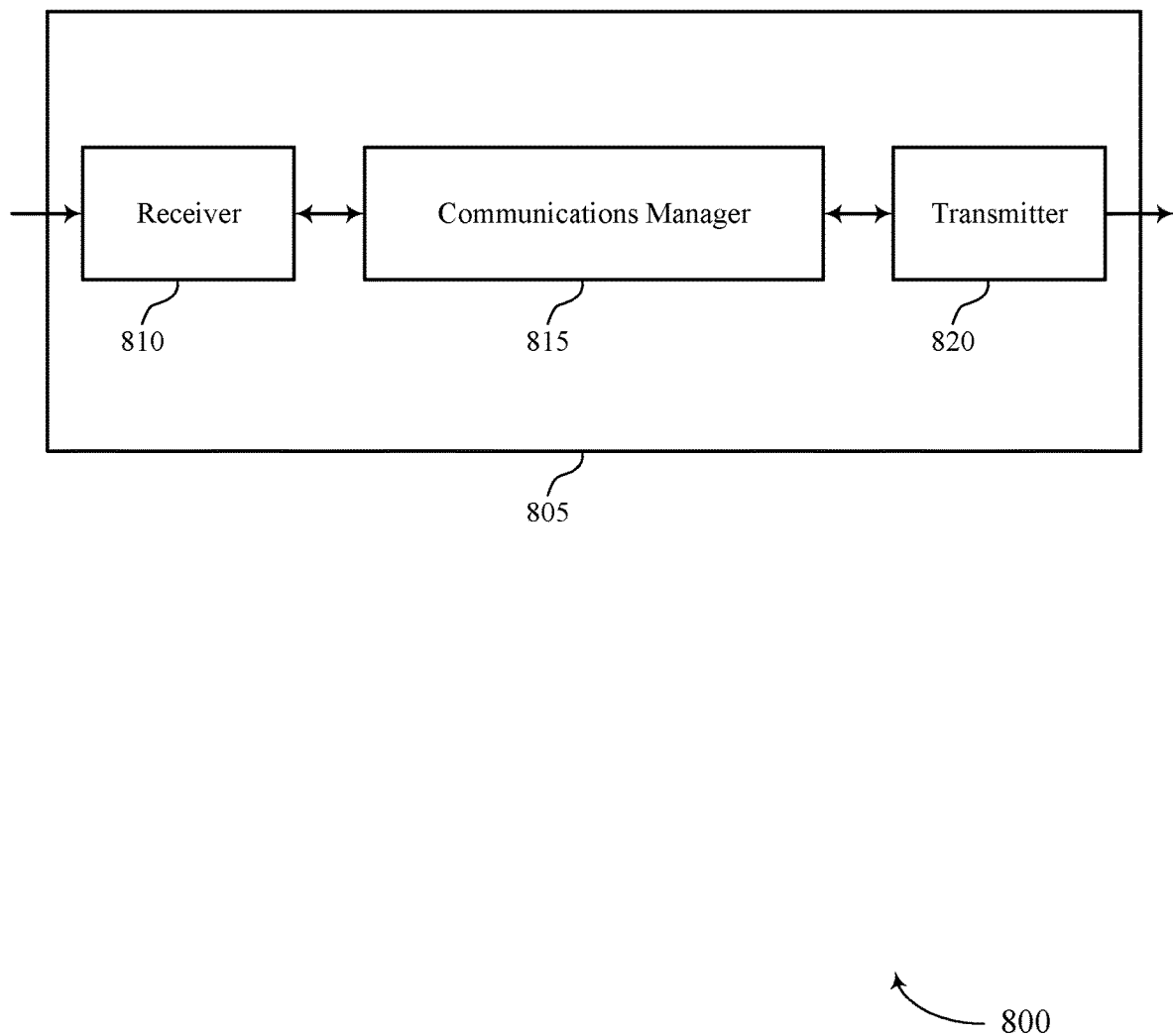
FIGS. 8 and 9 show block diagrams of devices that support encrypting NSSAI in accordance with aspects of the present disclosure.

FIG. 8 shows a block diagram 800 of a device 805 that supports encrypting NSSAI in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to encrypting NSSAI, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from an AMF, a security key, receive a control message from a UE, where the control message includes one or more encrypted S-NSSAI values or an encrypted NSSAI value having an indication of one or more network slices accessible to the UE in wireless communication with the device 805, and decrypt the one or more encrypted S-NSSAI values or the encrypted NSSAI value in the control message using the security key. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
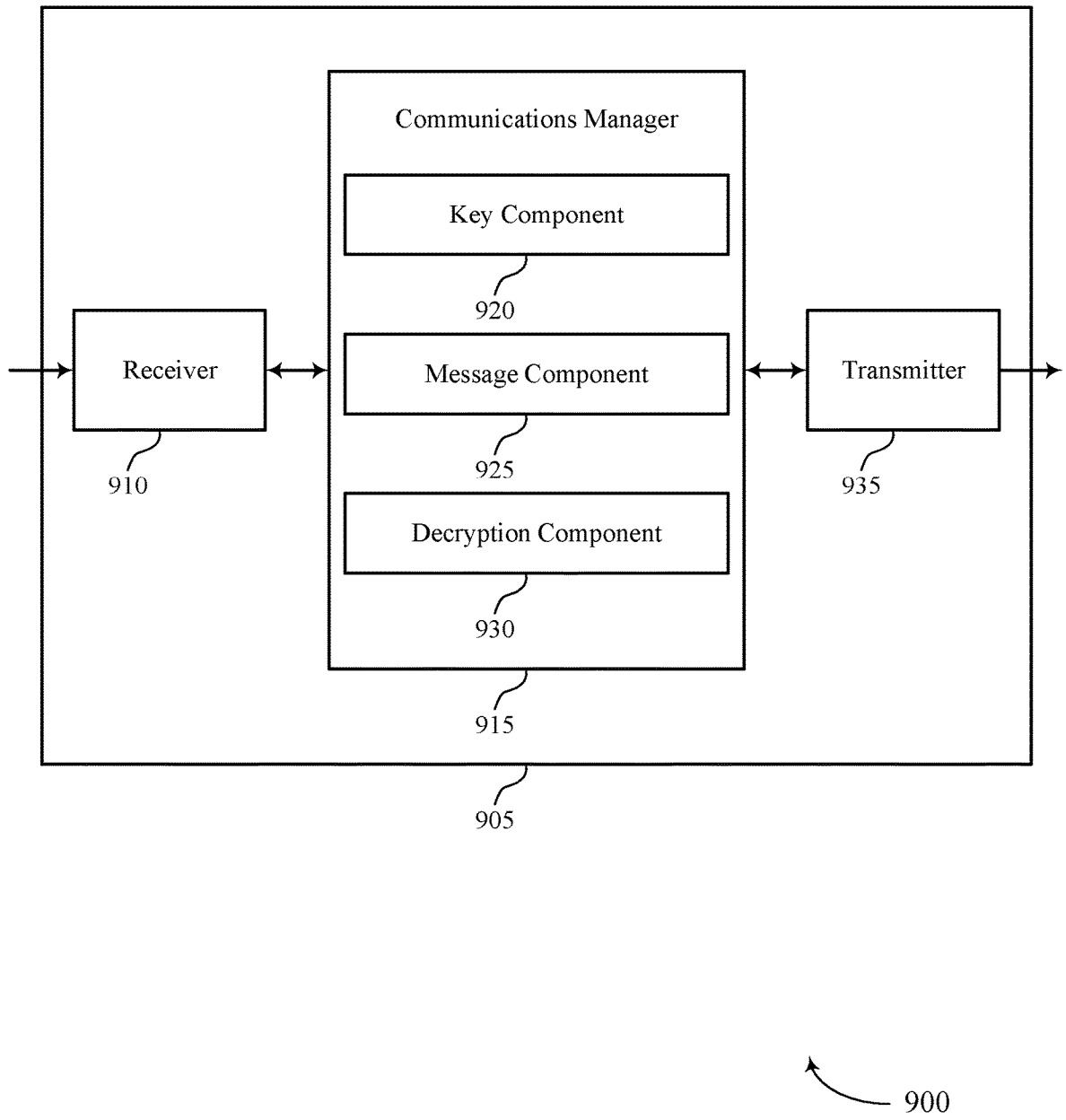

FIG. 9 shows a block diagram 900 of a device 905 that supports encrypting NSSAI in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to encrypting NSSAI, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a key component 920, a message component 925, and a decryption component 930. The communications manager 915 may be an example of aspects of the communications manager 1110 described herein.

The key component 920 may receive, from an AMF, a security key. The message component 925 may receive a control message from a UE, where the control message includes one or more encrypted S-NSSAI values or an encrypted NSSAI value having an indication of one or more network slices accessible to the UE in wireless communication with the device 805. The decryption component 930 may decrypt the one or more encrypted S-NSSAI values or the encrypted NSSAI value in the control message using the security key.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
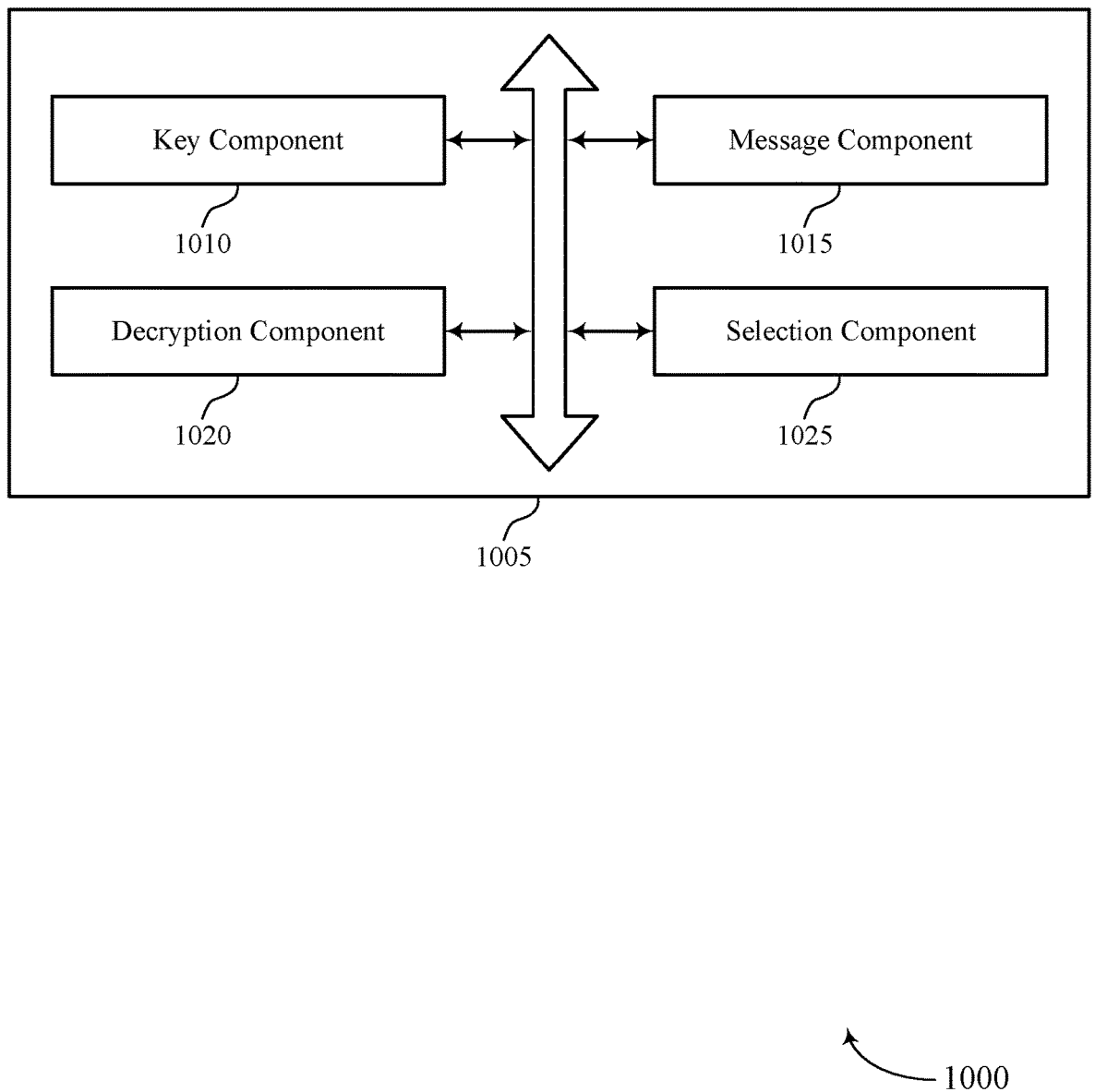
FIG. 10 shows a block diagram of a communications manager that supports encrypting NSSAI in accordance with aspects of the present disclosure.

FIG. 10 shows a block diagram 1000 of a communications manager 1005 that supports encrypting NSSAI in accordance with aspects of the present disclosure. The communications manager 1005 may be an example of aspects of a communications manager 815, a communications manager 915, or a communications manager 1110 described herein. The communications manager 1005 may include a key component 1010, a message component 1015, a decryption component 1020, and a selection component 1025. Each of these components may communicate, directly or indirectly, with one another (e.g., via one or more buses).

The key component 1010 may receive, from an AMF, a security key. In some examples, the key component 1010 may generate a second security key using the security key and a random number, where the security key is a master key, where decrypting the one or more encrypted S-NSSAI values or the encrypted NSSAI value in the control message using is further based on using the second security key.

The message component 1015 may receive a control message from a UE, where the control message includes one or more encrypted S-NSSAI values or an encrypted NSSAI value having an indication of one or more network slices accessible to the UE. In some examples, the message component 1015 may identify in the control message an indication of the security key and an encryption function associated with encryption of the one or more S-NSSAI values or the encrypted NSSAI value, where the indication includes a set of bits in an encryption packet of the control message, the encryption packet including the encrypted one or more S-NSSAI values or the encrypted NSSAI value, and where decrypting the one or more encrypted S-NSSAI values or the encrypted NSSAI value is further based on the indication of the security key and the encryption function.

In some examples, the message component 1015 may identify in the control message an indication associating the one or more encrypted S-NSSAI values or the encrypted NSSAI value with the UE, the indication including a set of bits in an encryption packet of the control message, the encryption packet including the one or more encrypted S-NSSAI values or the encrypted NSSAI value, and where the set of bits includes a random number. In some examples, the message component 1015 may transmit a second indication of the selected network slices to the UE, the second indication including a global unique temporary identifier associated with the UE. In some examples, the message component 1015 may receive a second control message including one or more encrypted new S-NSSAI values from the UE, where the second control message includes a security key refresh value associated with decrypting the encrypted new S-NSSAI.

The decryption component 1020 may decrypt the one or more encrypted S-NSSAI values or the encrypted NSSAI value in the control message using the security key. In some examples, the decryption component 1020 may decrypt an expanded encryption packet including both additional slice information and the one or more encrypted S-NSSAI values or the encrypted NSSAI value using the security key, where receiving the one or more encrypted S-NSSAI values or the encrypted NSSAI value from the UE includes receiving the expanded encryption packet. The selection component 1025 may select one or more network slices for the UE based on the one or more encrypted S-NSSAI values or the encrypted NSSAI value.

Figure 11:
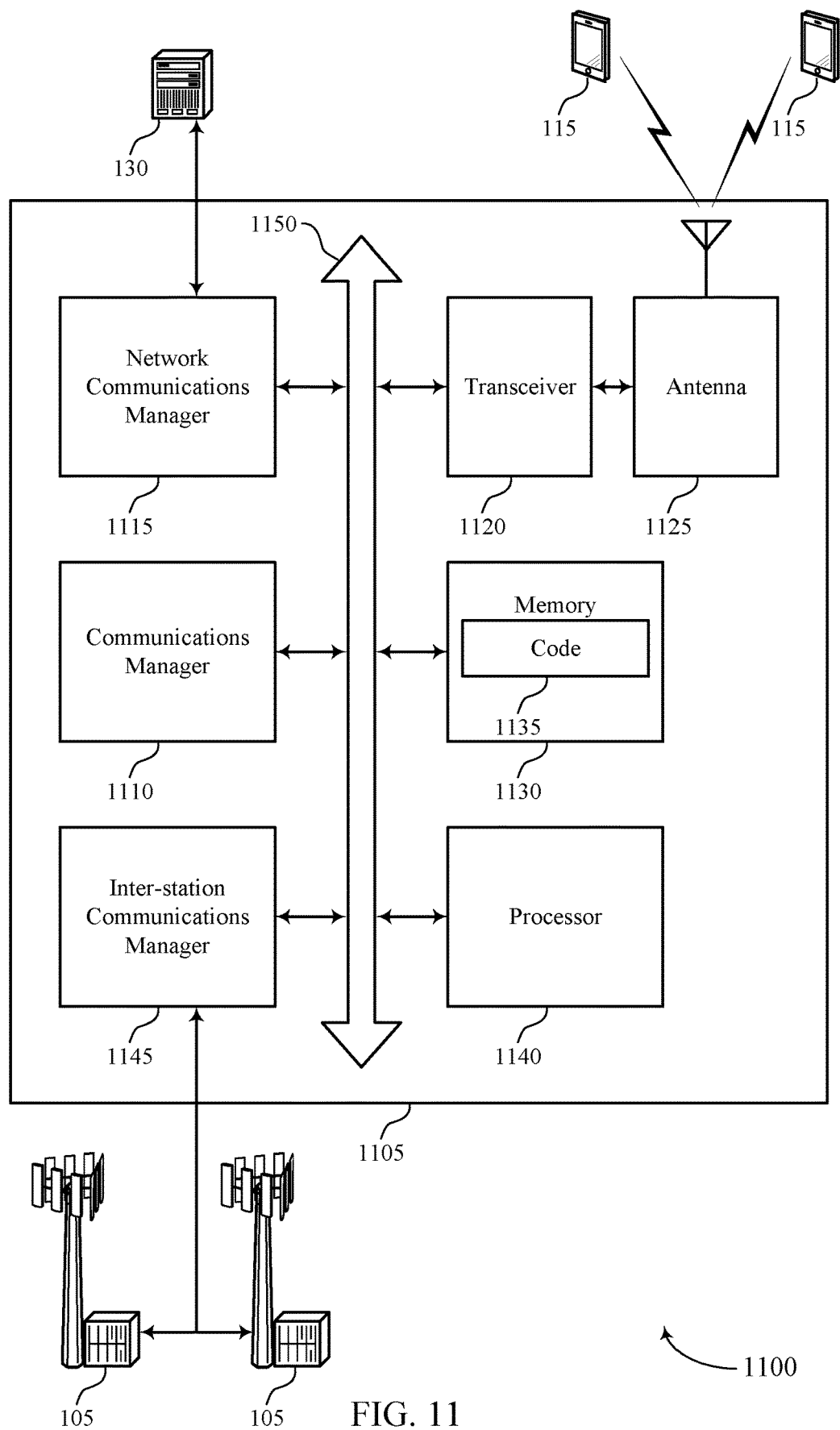
FIG. 11 shows a diagram of a system including a device that supports encrypting NSSAI in accordance with aspects of the present disclosure.

FIG. 11 shows a diagram of a system 1100 including a device 1105 that supports encrypting NSSAI in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from an AMF, a security key, receive a control message from a UE, where the control message includes one or more encrypted S-NSSAI values or an encrypted NSSAI value having an indication of one or more network slices accessible to the UE in wireless communication with the device 1105, and decrypt the one or more encrypted S-NSSAI values or the encrypted NSSAI value in the control message using the security key.

The network communications manager 1115 may manage communications with the core network (e.g., via one or more wired backhaul links). For example, the network communications manager 1115 may manage the transfer of data communications for client devices, such as one or more UEs 115. The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting encrypting NSSAI).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
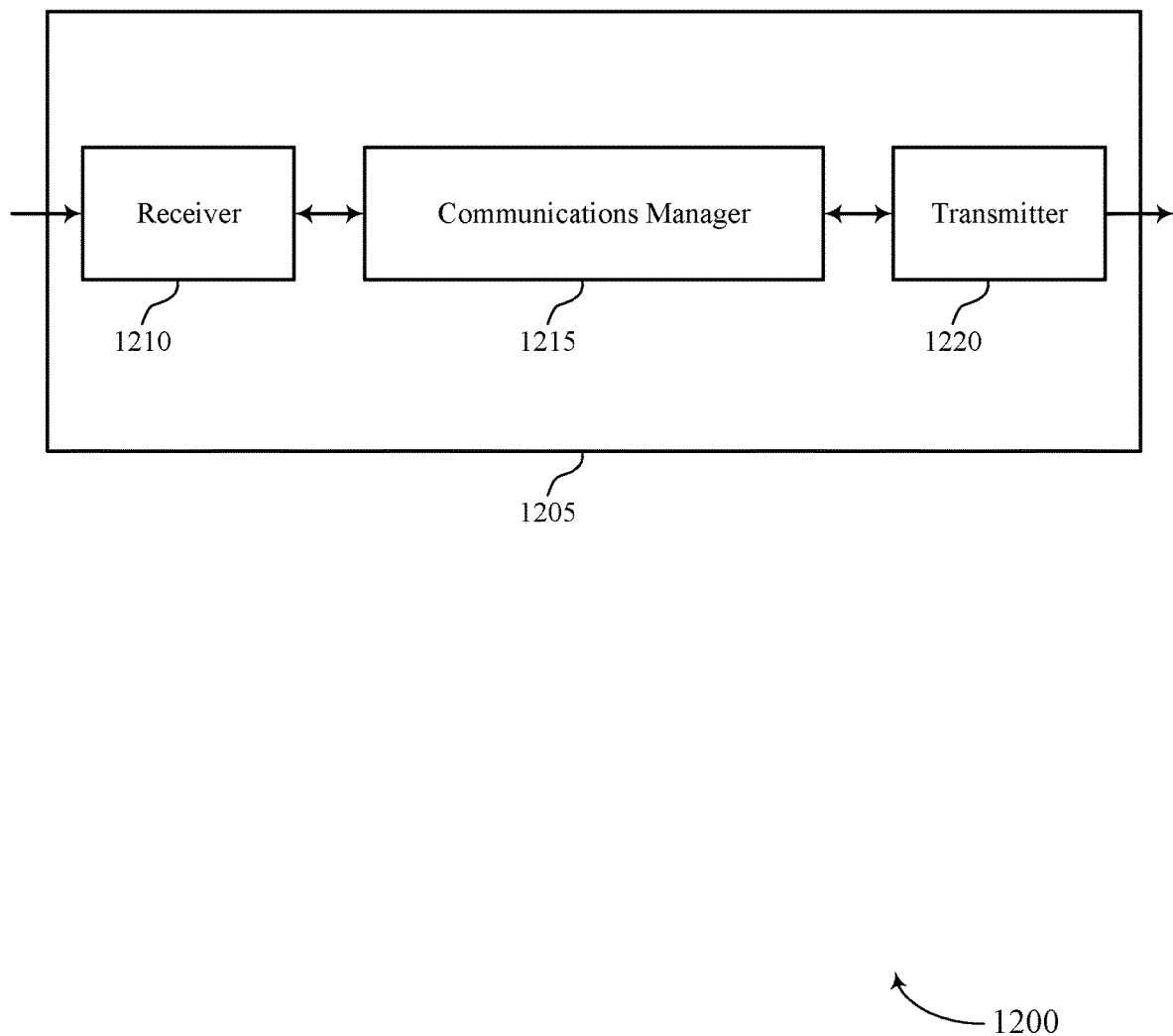
FIGS. 12 and 13 show block diagrams of devices that support encrypting NSSAI in accordance with aspects of the present disclosure.

FIG. 12 shows a block diagram 1200 of a device 1205 that supports encrypting NSSAI in accordance with aspects of the present disclosure. The device 1205 may be an example of aspects of a network entity (e.g., a core network, or an AMF) as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to encrypting NSSAI, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may encrypt one or more S-NSSAI values or a NSSAI value using a security key, where the one or more S-NSSAI values or the NSSAI value includes an indication of one or more network slices accessible to a UE, transmit, to the UE, a control message that includes the one or more encrypted S-NSSAI values or the encrypted NSSAI value, and transmit the security key to a base station so that the base station is enabled to decrypt the one or more encrypted S-NSSAI values or the encrypted NSSAI value upon receipt from the UE.

The communications manager 1215 may also generate a random number associated with a UE identifier, generate a second security key using a first security key and a random number, where the first security key is a master key, and the second security key is associated with a UE of the UE identifier, and transmit the second security key to the UE so that the UE is enabled to encrypt S-NSSAI or NSSAI. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
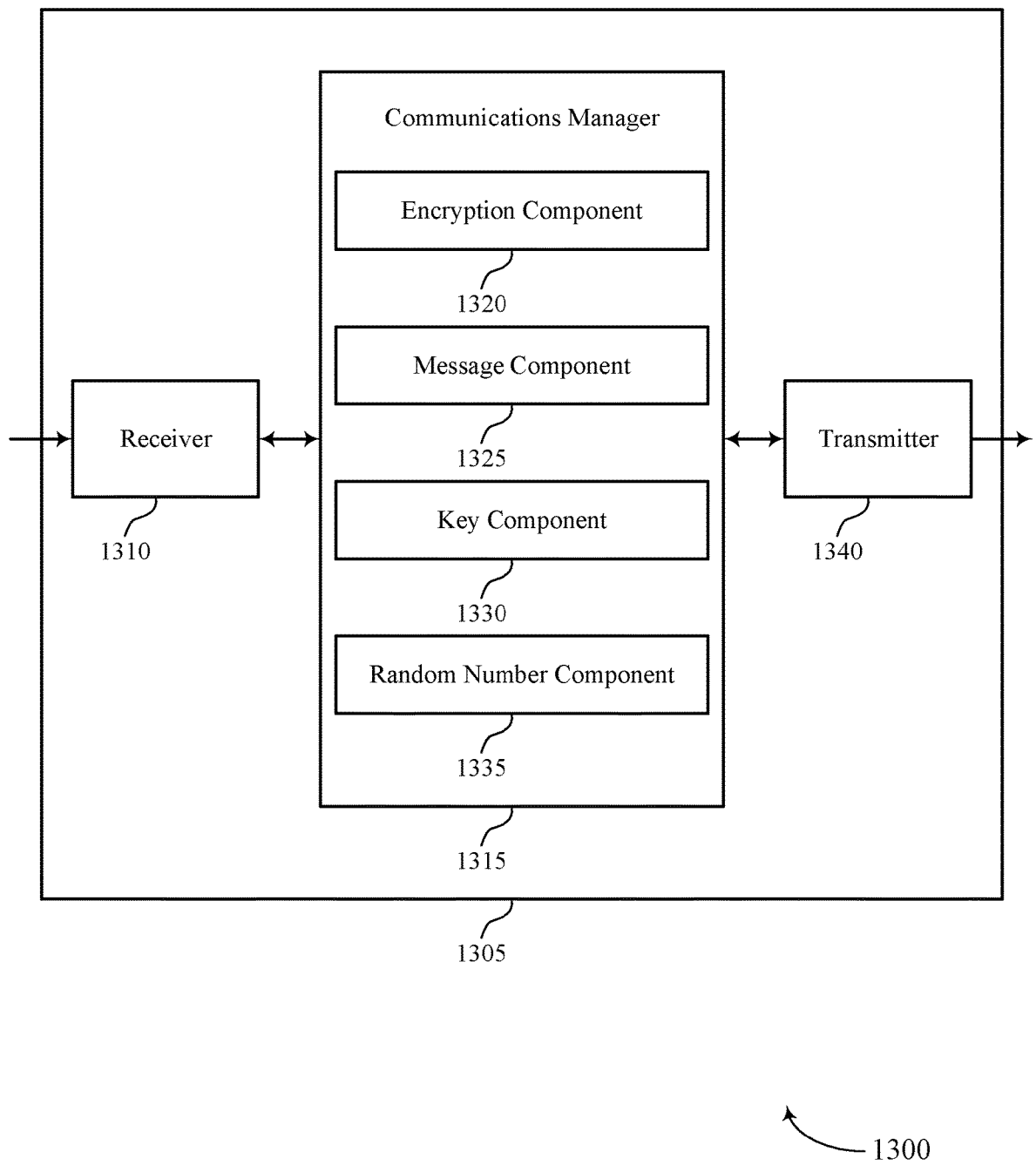

FIG. 13 shows a block diagram 1300 of a device 1305 that supports encrypting NSSAI in accordance with aspects of the present disclosure. The device 1305 may be an example of aspects of a device 1205 or a network entity (e.g., AMF) as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to encrypting NSSAI, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an encryption component 1320, a message component 1325, a key component 1330, and a random number component 1335. The communications manager 1315 may be an example of aspects of the communications manager 1510 described herein.

The encryption component 1320 may encrypt one or more S-NSSAI values or a NSSAI value using a security key, where the one or more S-NSSAI values or the NSSAI value includes an indication of one or more network slices accessible to a UE. The message component 1325 may transmit, to the UE, a control message that includes the one or more encrypted S-NSSAI values or the encrypted NSSAI value. The key component 1330 may transmit the security key to a base station so that the base station is enabled to decrypt the one or more encrypted S-NSSAI values or the encrypted NSSAI value upon receipt from the UE. The random number component 1335 may generate a random number associated with a UE identifier. The key component 1330 may generate a second security key using a first security key and a random number, where the first security key is a master key, and the second security key is associated with a UE of the UE identifier and transmit the second security key to the UE so that the UE is enabled to encrypt S-NSSAI or NSSAI.

The transmitter 1340 may transmit signals generated by other components of the device 1305. In some examples, the transmitter 1340 may be collocated with a receiver 1310 in a transceiver component. For example, the transmitter 1340 may be an example of aspects of the transceiver 1520 described with reference to FIG. 15. The transmitter 1340 may utilize a single antenna or a set of antennas.

Figure 14:
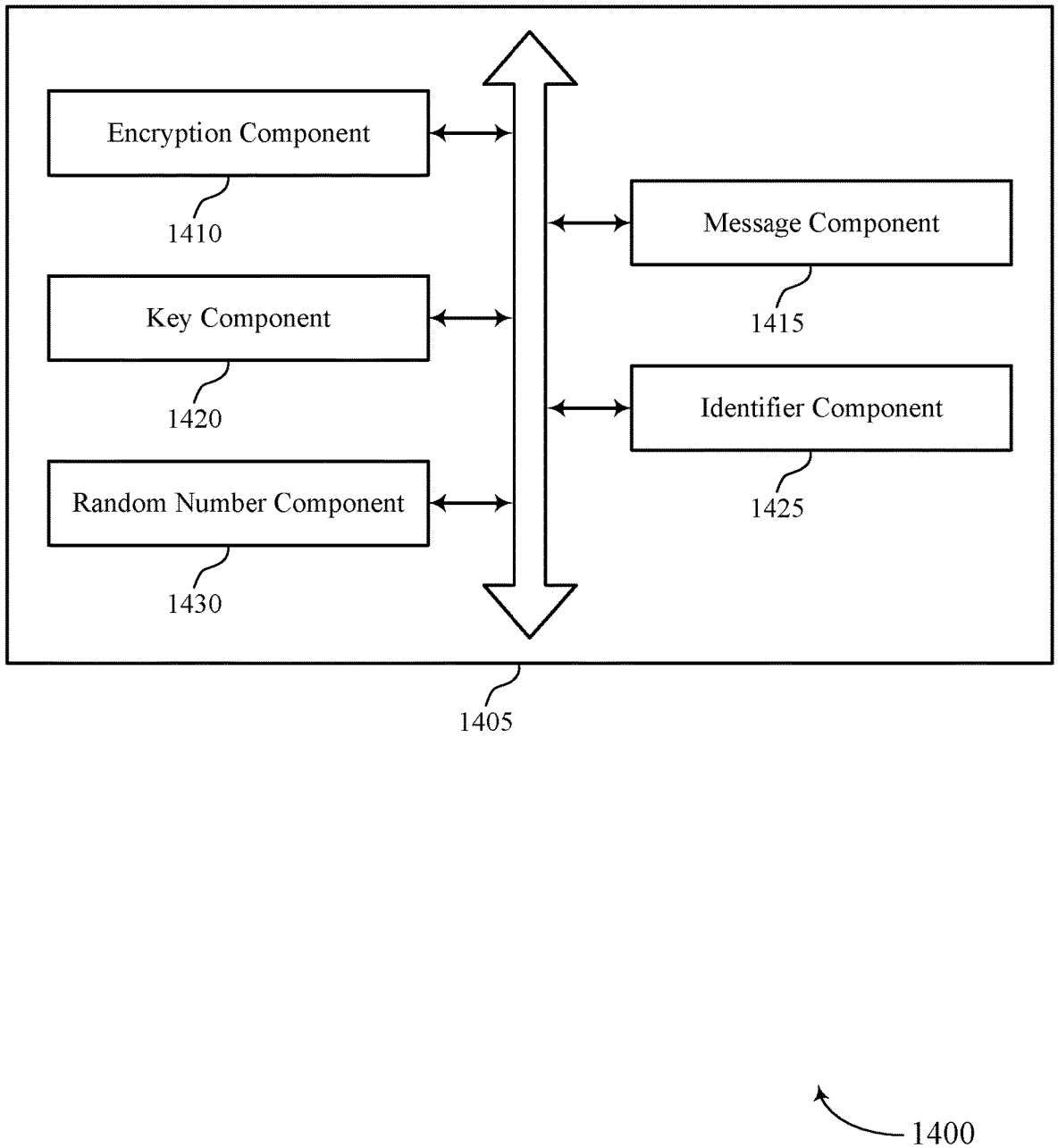
FIG. 14 shows a block diagram of a communications manager that supports encrypting NSSAI in accordance with aspects of the present disclosure.

FIG. 14 shows a block diagram 1400 of a communications manager 1405 that supports encrypting NSSAI in accordance with aspects of the present disclosure. The communications manager 1405 may be an example of aspects of a communications manager 1215, a communications manager 1315, or a communications manager 1510 described herein. The communications manager 1405 may include an encryption component 1410, a message component 1415, a key component 1420, an identifier component 1425, and a random number component 1430. Each of these components may communicate, directly or indirectly, with one another (e.g., via one or more buses).

The encryption component 1410 may encrypt one or more S-NSSAI values or a NSSAI value using a security key, where the one or more S-NSSAI values or the NSSAI value includes an indication of one or more network slices accessible to a UE. The encryption component 1410 may prepare an encryption packet that includes the one or more encrypted S-NSSAI values or the encrypted NSSAI value, and an indication of the security key and an encryption function associated with the encrypting of the one or more S-NSSAI values or the NSSAI value, where the indication includes a set of bits in the encryption packet. In some examples, the encryption component 1410 may prepare an encryption packet that includes the encrypted one or more S-NSSAI values or the encrypted NSSAI value, and an indication associating the one or more encrypted S-NSSAI or the encrypted NSSAI value with the UE, the indication including a set of bits in the encryption packet, and where the set of bits includes a random number. In some examples, the encryption component 1410 may encrypt the one or more S-NSSAI values or the NSSAI value using the global unique temporary identifier associated with the UE.

The message component 1415 may transmit, to the UE, a control message that includes the one or more encrypted S-NSSAI values or the encrypted NSSAI value. The key component 1420 may transmit the security key to a base station so that the base station is enabled to decrypt the one or more encrypted S-NSSAI values or the encrypted NSSAI value upon receipt from the UE. In some examples, the key component 1420 may generate a second security key using a first security key and a random number, where the first security key is a master key, and the second security key is associated with a UE of the UE identifier. In some examples, the key component 1420 may transmit the second security key to the UE so that the UE is enabled to encrypt S-NSSAI or NSSAI. In some examples, the key component 1420 may generate the second security key using the first security key, the random number, or a global unique temporary identifier associated with the UE, or a combination thereof. In some examples, the key component 1420 may transmit the second security key and the random number to the UE in a non-access stratum message.

The random number component 1430 may generate a random number associated with a UE identifier. The identifier component 1425 may identify a global unique temporary identifier associated with the UE, where the indication further includes the global unique temporary identifier. In some examples, the identifier component 1425 may generate the global unique temporary identifier based on a random number. In some examples, the identifier component 1425 may assign the global unique temporary identifier to the UE based on the generating, where generating the second security key is further based on the global unique temporary identifier.

Figure 15:
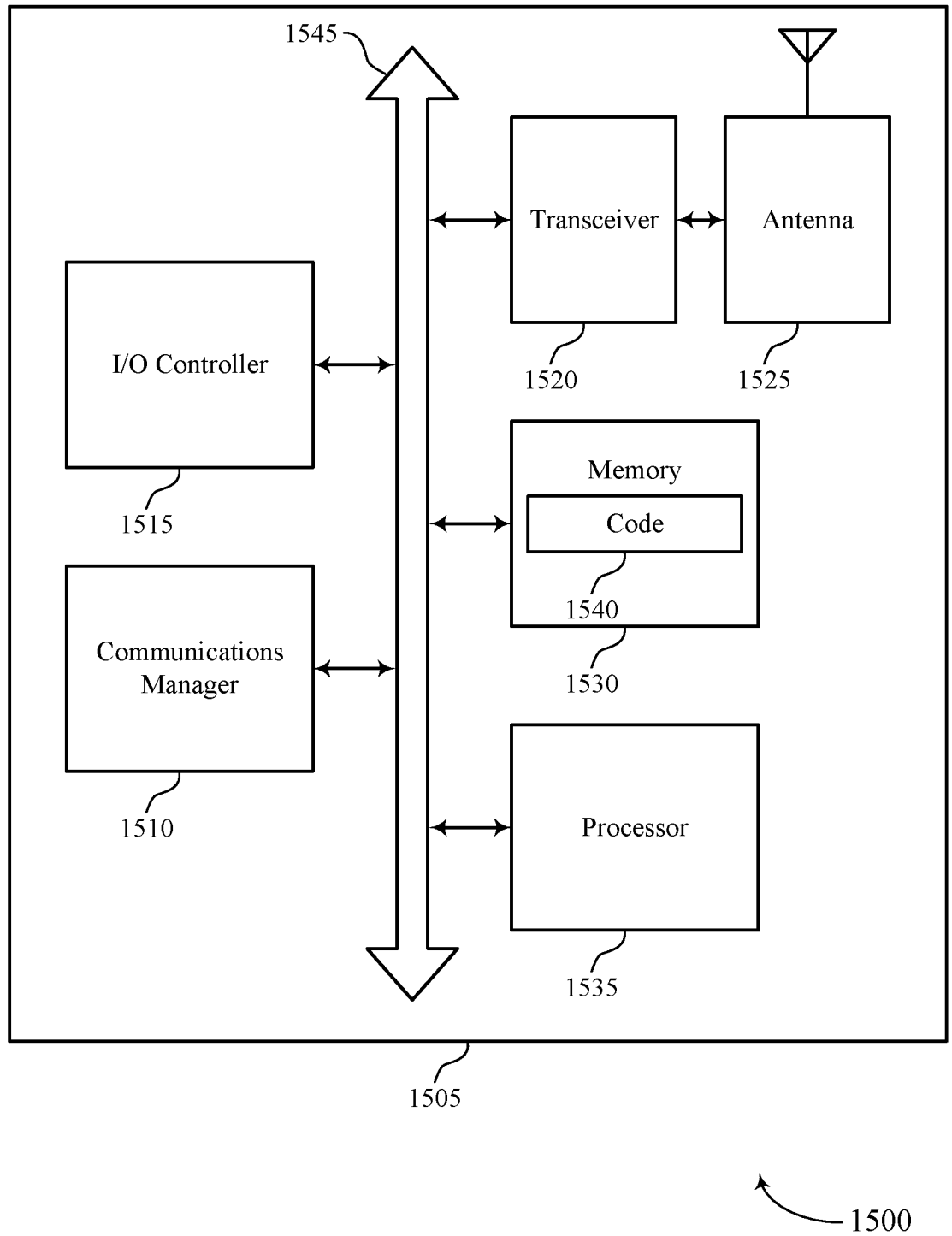
FIG. 15 shows a diagram of a system including a device that supports encrypting NSSAI in accordance with aspects of the present disclosure.

FIG. 15 shows a diagram of a system 1500 including a device 1505 that supports encrypting NSSAI in accordance with aspects of the present disclosure. The device 1505 may be an example of or include the components of device 1205, device 1305, or a network entity as described herein. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may encrypt one or more S-NSSAI values or a NSSAI value using a security key, where the one or more S-NSSAI values or the NSSAI value includes an indication of one or more network slices accessible to a UE, transmit, to the UE, a control message that includes the one or more encrypted S-NSSAI values or the encrypted NSSAI value, and transmit the security key to a base station so that the base station is enabled to decrypt the one or more encrypted S-NSSAI values or the encrypted NSSAI value upon receipt from the UE. The communications manager 1510 may also generate a random number associated with a UE identifier, generate a second security key using a first security key and a random number, where the first security key is a master key, and the second security key is associated with a UE of the UE identifier, and transmit the second security key to the UE so that the UE is enabled to encrypt S-NSSAI or NSSAI.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device 1505 may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting encrypting NSSAI).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
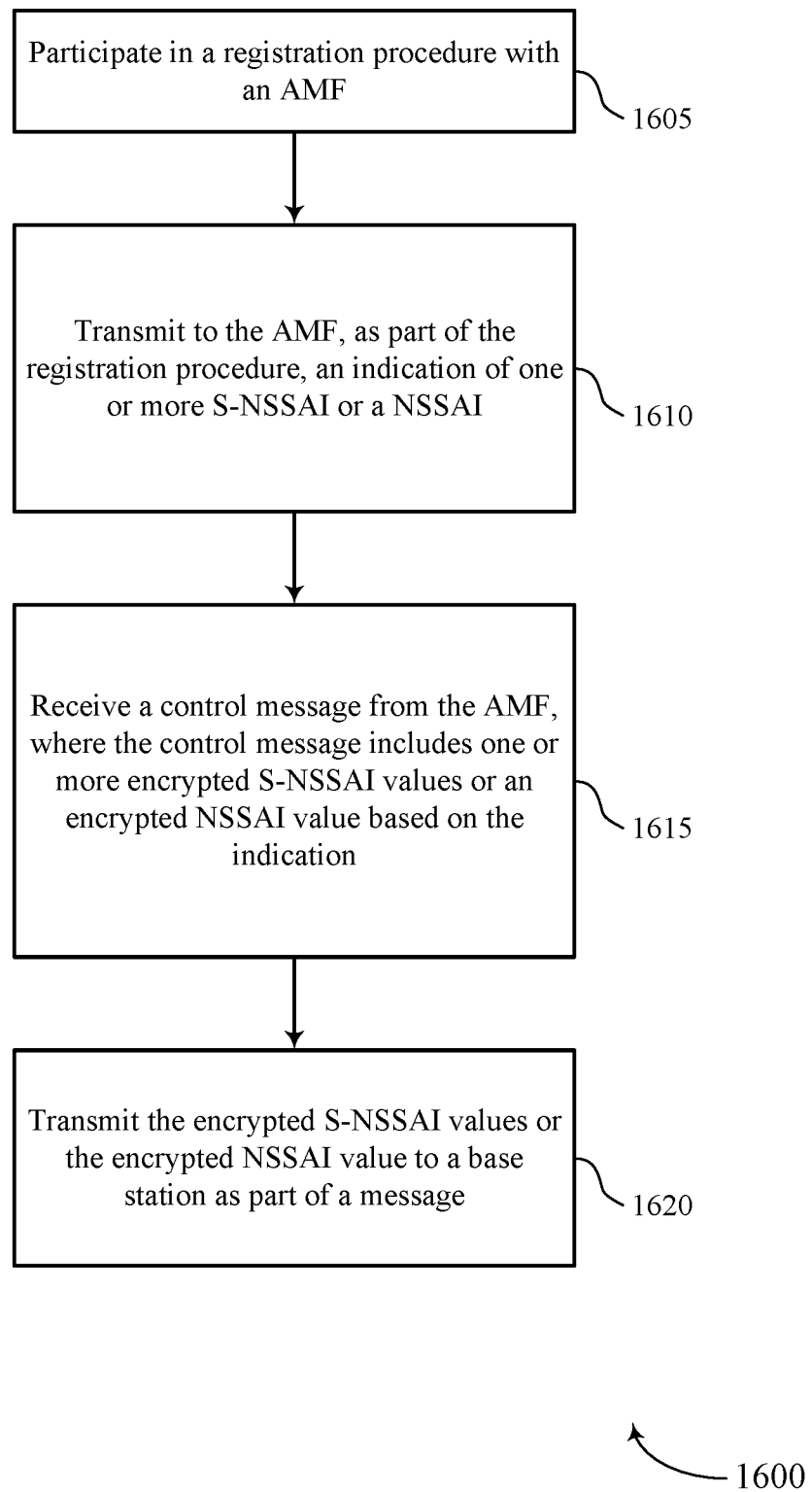
FIGS. 16 through 22 show flowcharts illustrating methods that support encrypting NSSAI in accordance with aspects of the present disclosure.

FIG. 16 shows a flowchart illustrating a method 1600 that supports encrypting NSSAI in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1605, the UE may participate in a registration procedure with an AMF. The operations of 1605 may be performed according to the methods described herein. In some examples, aspects of the operations of 1605 may be performed by a connection procedure component as described with reference to FIGS. 4 through 7.

At 1610, the UE may transmit to the AMF, as part of the registration procedure, an indication of one or more S-NSSAI or an NSSAI. The operations of 1610 may be performed according to the methods described herein. In some examples, aspects of the operations of 1610 may be performed by an indication component as described with reference to FIGS. 4 through 7.

At 1615, the UE may receive a control message from the AMF, where the control message includes one or more encrypted S-NSSAI values or an encrypted NSSAI value based on the indication. The operations of 1615 may be performed according to the methods described herein. In some examples, aspects of the operations of 1615 may be performed by a message component as described with reference to FIGS. 4 through 7.

At 1620, the UE may transmit the encrypted S-NSSAI values or the encrypted NSSAI value to a base station as part of a message. The operations of 1620 may be performed according to the methods described herein. In some examples, aspects of the operations of 1620 may be performed by an encryption component as described with reference to FIGS. 4 through 7.

Figure 17:
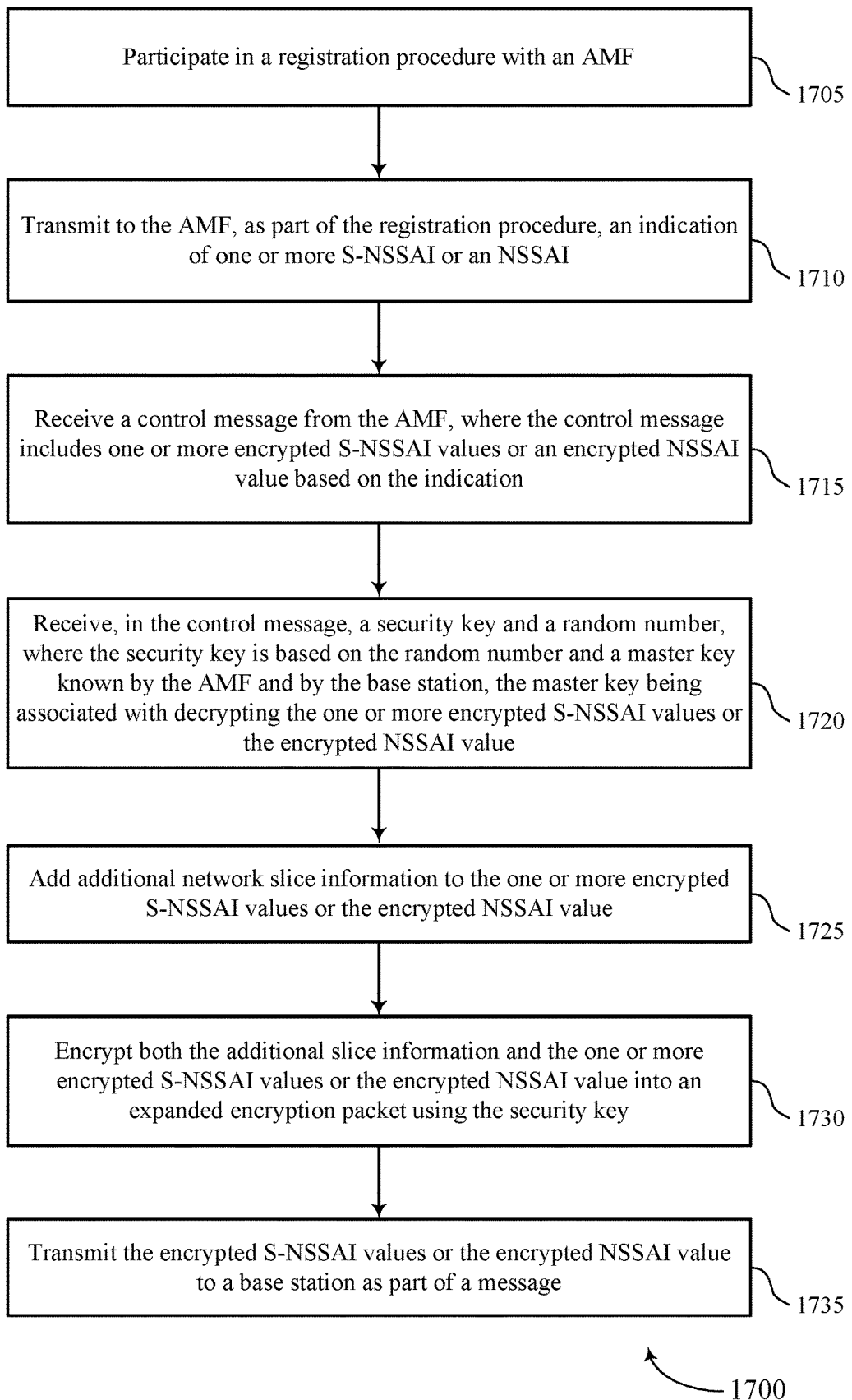

FIG. 17 shows a flowchart illustrating a method 1700 that supports encrypting NSSAI in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1705, the UE may participate in a registration procedure with an AMF. The operations of 1705 may be performed according to the methods described herein. In some examples, aspects of the operations of 1705 may be performed by a connection procedure component as described with reference to FIGS. 4 through 7.

At 1710, the UE may transmit to the AMF, as part of the registration procedure, an indication of one or more S-NSSAI or an NSSAI. The operations of 1710 may be performed according to the methods described herein. In some examples, aspects of the operations of 1710 may be performed by an indication component as described with reference to FIGS. 4 through 7.

At 1715, the UE may receive a control message from the AMF, where the control message includes one or more encrypted S-NSSAI values or an encrypted NSSAI value based on the indication. The operations of 1715 may be performed according to the methods described herein. In some examples, aspects of the operations of 1715 may be performed by a message component as described with reference to FIGS. 4 through 7.

At 1720, the UE may receive, in the control message, a security key and a random number, where the security key is based on the random number and a master key known by the AMF and by the base station, the master key being associated with decrypting the one or more encrypted S-NSSAI values or the encrypted NSSAI value. The operations of 1720 may be performed according to the methods described herein. In some examples, aspects of the operations of 1720 may be performed by a key component as described with reference to FIGS. 4 through 7.

At 1725, the UE may add additional network slice information to the one or more encrypted S-NSSAI values or the encrypted NSSAI value. The operations of 1725 may be performed according to the methods described herein. In some examples, aspects of the operations of 1725 may be performed by a key component as described with reference to FIGS. 4 through 7.

At 1730, the UE may encrypt both the additional slice information and the one or more encrypted S-NSSAI values or the encrypted NSSAI value into an expanded encryption packet using the security key. The operations of 1730 may be performed according to the methods described herein. In some examples, aspects of the operations of 1730 may be performed by an encryption component as described with reference to FIGS. 4 through 7.

At 1735, the UE may transmit the encrypted S-NSSAI values or the encrypted NSSAI value to a base station as part of a message. In some examples, transmitting the encrypted S-NSSAI values or the encrypted NSSAI value to the base station includes transmitting the expanded encryption packet. The operations of 1735 may be performed according to the methods described herein. In some examples, aspects of the operations of 1735 may be performed by an encryption component as described with reference to FIGS. 4 through 7.

Figure 18:
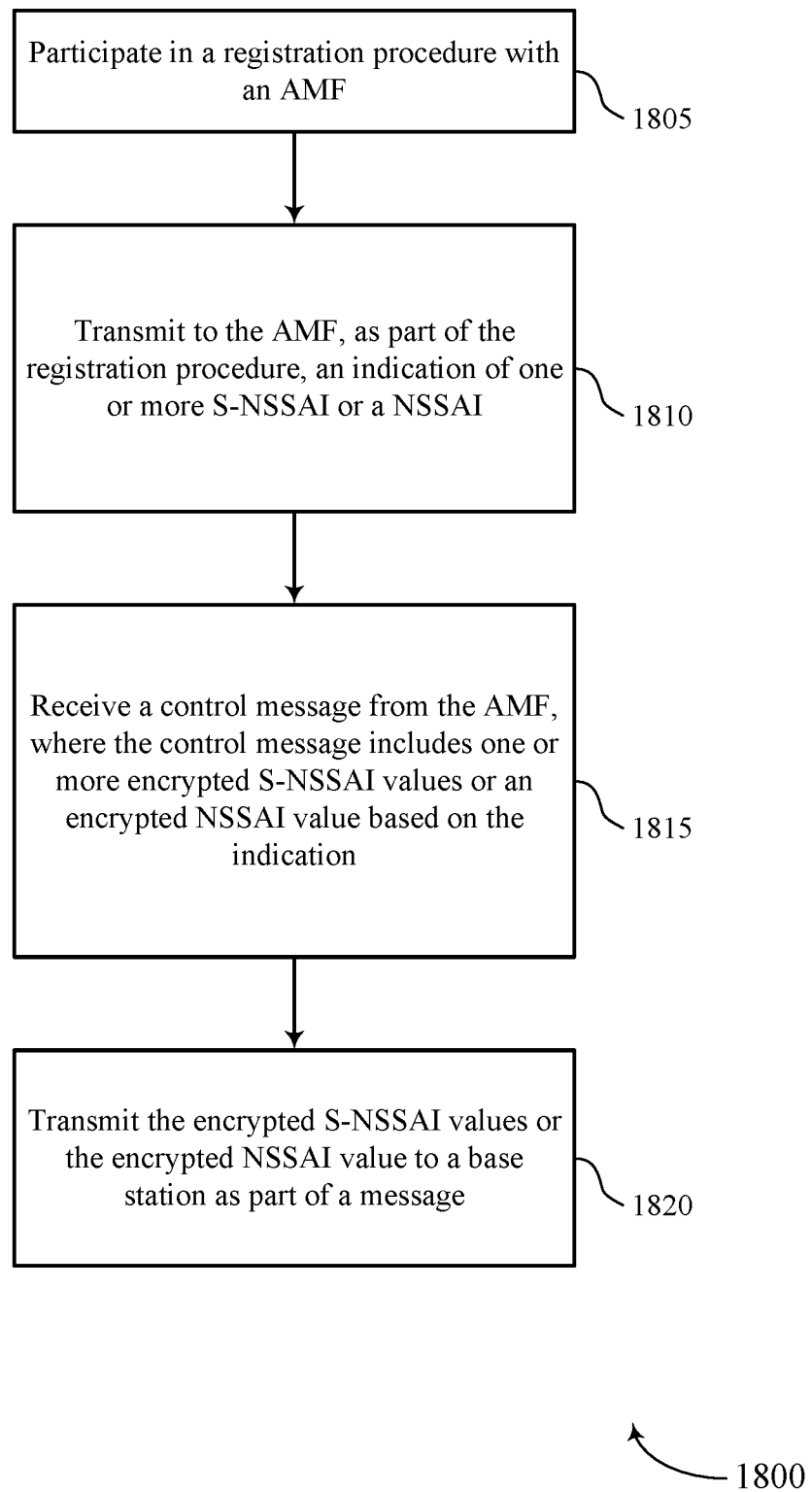

FIG. 18 shows a flowchart illustrating a method 1800 that supports encrypting NSSAI in accordance with aspects of the present disclosure. The operations of method 1800 may be implemented by a UE 115 or its components as described herein. For example, the operations of method 1800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1805, the UE may participate in a registration procedure with an AMF. The operations of 1805 may be performed according to the methods described herein. In some examples, aspects of the operations of 1805 may be performed by a connection procedure component as described with reference to FIGS. 4 through 7.

At 1810, the UE may transmit to the AMF, as part of the registration procedure, an indication of one or more S-NSSAI or a NSSAI. The operations of 1810 may be performed according to the methods described herein. In some examples, aspects of the operations of 1810 may be performed by an indication component as described with reference to FIGS. 4 through 7.

At 1815, the UE may receive a control message from the AMF, where the control message includes one or more encrypted S-NSSAI values or an encrypted NSSAI value based on the indication. The operations of 1815 may be performed according to the methods described herein. In some examples, aspects of the operations of 1815 may be performed by a message component as described with reference to FIGS. 4 through 7.

At 1820, the UE may transmit the encrypted S-NSSAI values or the encrypted NSSAI value to a base station as part of a message. The operations of 1820 may be performed according to the methods described herein. In some examples, aspects of the operations of 1820 may be performed by an encryption component as described with reference to FIGS. 4 through 7.

Figure 19:
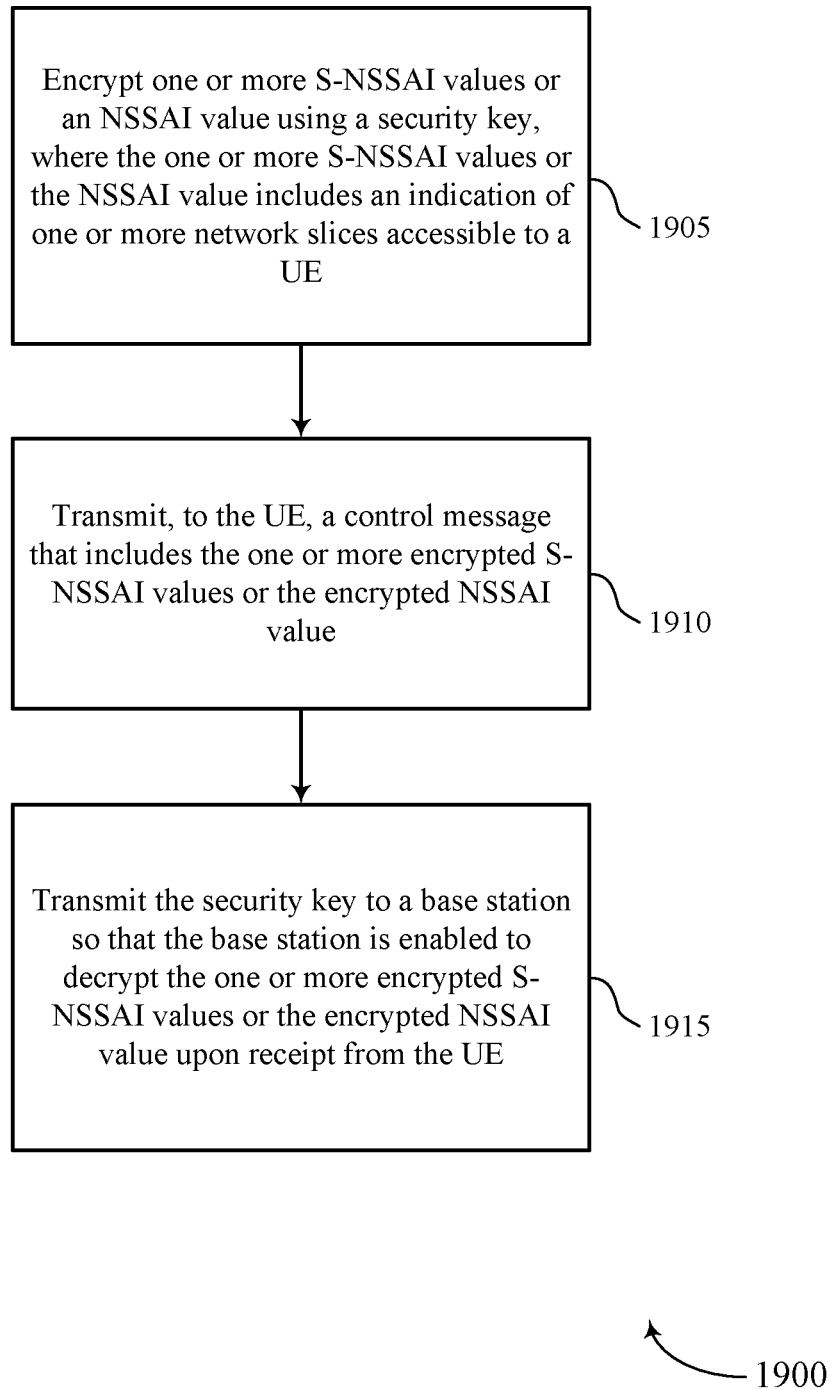

FIG. 19 shows a flowchart illustrating a method 1900 that supports encrypting NSSAI in accordance with aspects of the present disclosure. The operations of method 1900 may be implemented by a network entity or its components as described herein. For example, the operations of method 1900 may be performed by a communications manager as described with reference to FIGS. 12 through 15. In some examples, a network entity may execute a set of instructions to control the functional elements of the network entity to perform the functions described herein. Additionally or alternatively, a network entity may perform aspects of the functions described herein using special-purpose hardware.

At 1905, the network entity may encrypt one or more S-NSSAI values or an NSSAI value using a security key, where the one or more S-NSSAI values or the NSSAI value includes an indication of one or more network slices accessible to a UE. The operations of 1905 may be performed according to the methods described herein. In some examples, aspects of the operations of 1905 may be performed by an encryption component as described with reference to FIGS. 12 through 15.

At 1910, the network entity may transmit, to the UE, a control message that includes the one or more encrypted S-NSSAI values or the encrypted NSSAI value. The operations of 1910 may be performed according to the methods described herein. In some examples, aspects of the operations of 1910 may be performed by a message component as described with reference to FIGS. 12 through 15.

At 1915, the network entity may transmit the security key to a base station so that the base station is enabled to decrypt the one or more encrypted S-NSSAI values or the encrypted NSSAI value upon receipt from the UE. The operations of 1915 may be performed according to the methods described herein. In some examples, aspects of the operations of 1915 may be performed by a key component as described with reference to FIGS. 12 through 15.

Figure 20:
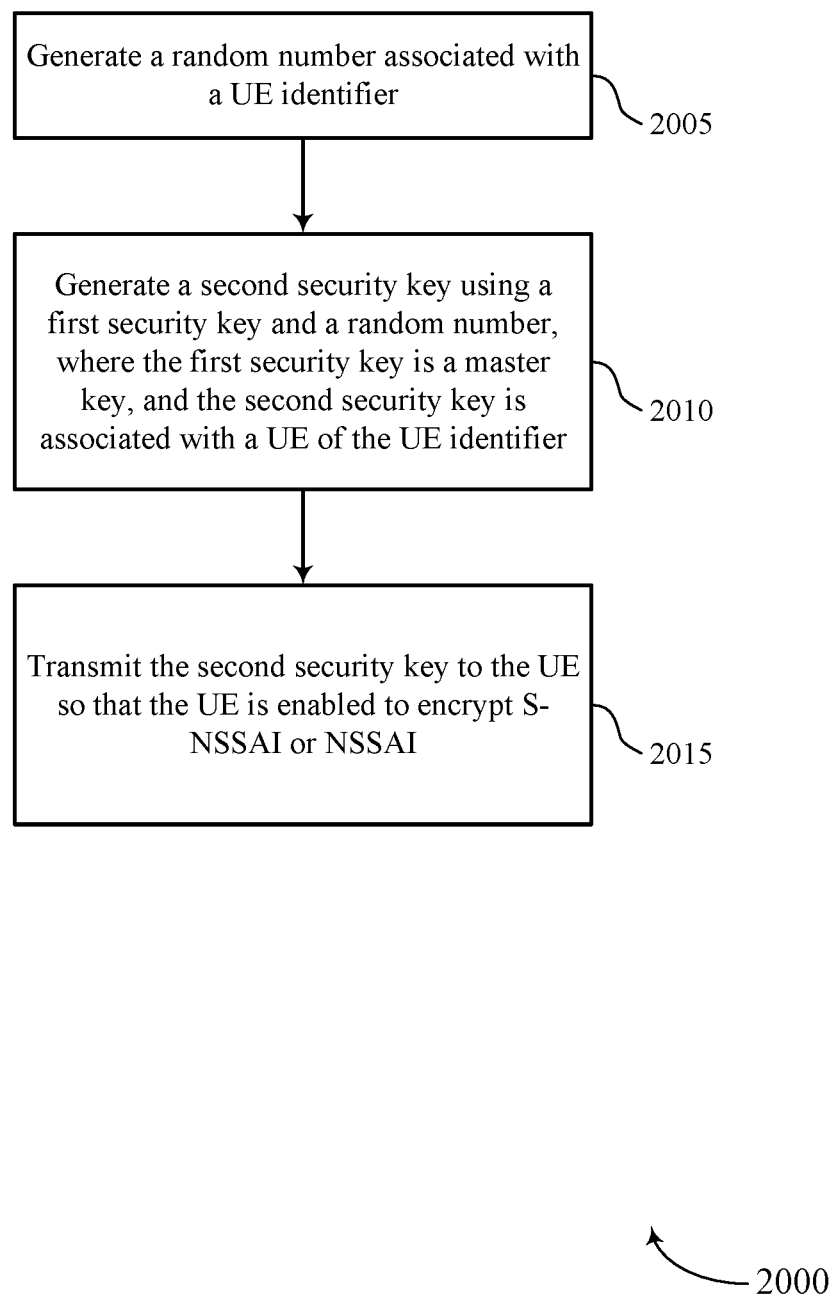

FIG. 20 shows a flowchart illustrating a method 2000 that supports encrypting NSSAI in accordance with aspects of the present disclosure. The operations of method 2000 may be implemented by a network entity (e.g., an AMF) or its components as described herein. For example, the operations of method 2000 may be performed by a communications manager as described with reference to FIGS. 12 through 15. In some examples, a network entity may execute a set of instructions to control the functional elements of the network entity to perform the functions described herein. Additionally or alternatively, a network entity may perform aspects of the functions described herein using special-purpose hardware.

At 2005, the network entity may generate a random number associated with a UE identifier. The operations of 2005 may be performed according to the methods described herein. In some examples, aspects of the operations of 2005 may be performed by a random number component as described with reference to FIGS. 12 through 15.

At 2010, the network entity may generate a second security key using a first security key and a random number, where the first security key is a master key, and the second security key is associated with a UE of the UE identifier. The operations of 2010 may be performed according to the methods described herein. In some examples, aspects of the operations of 2010 may be performed by a key component as described with reference to FIGS. 12 through 15.

At 2015, the network entity may transmit the second security key to the UE so that the UE is enabled to encrypt S-NSSAI or NSSAI. The operations of 2015 may be performed according to the methods described herein. In some examples, aspects of the operations of 2015 may be performed by a key component as described with reference to FIGS. 12 through 15.

Figure 21:
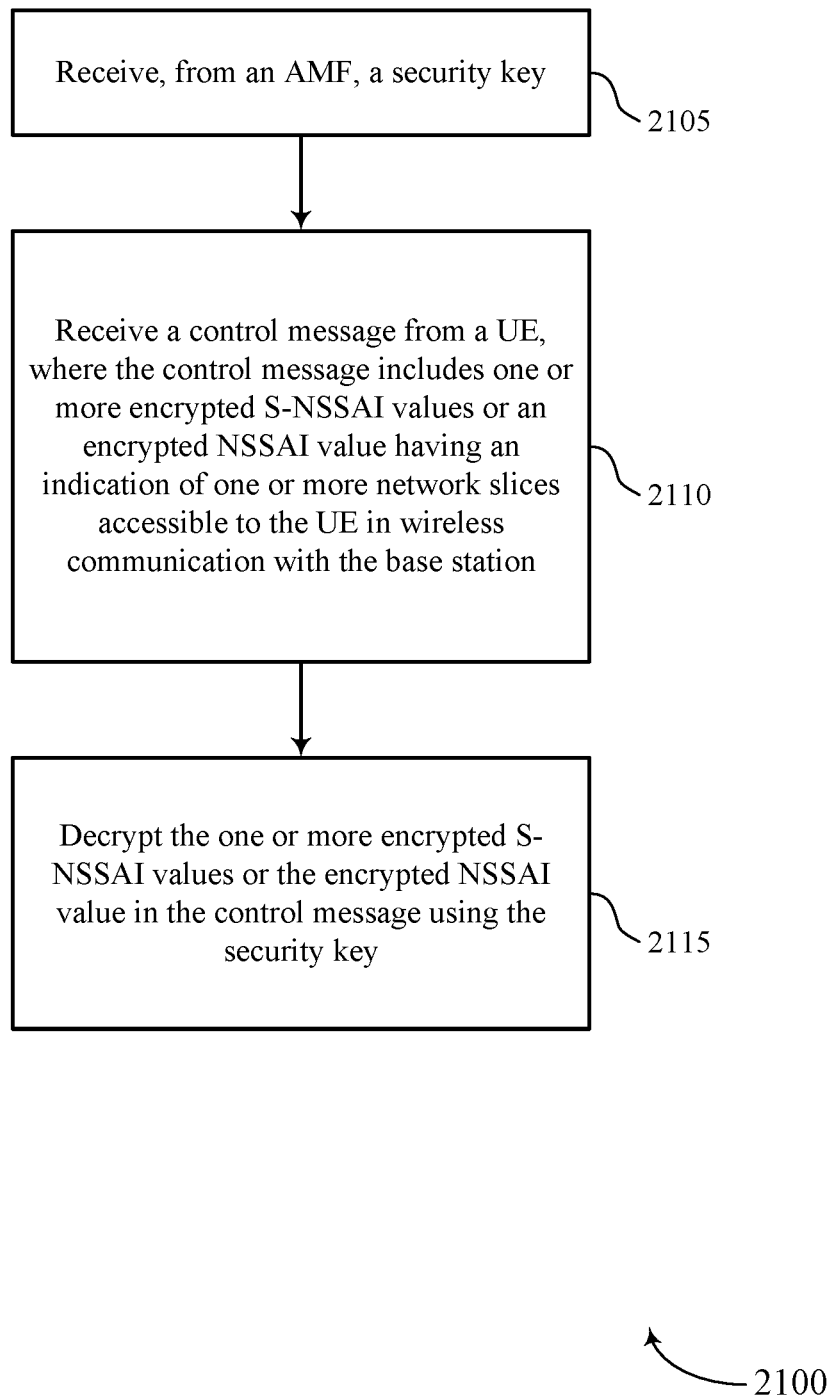

FIG. 21 shows a flowchart illustrating a method 2100 that supports encrypting NSSAI in accordance with aspects of the present disclosure. The operations of method 2100 may be implemented by a base station 105 or its components as described herein. For example, the operations of method 2100 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2105, the base station may receive, from an AMF, a security key. The operations of 2105 may be performed according to the methods described herein. In some examples, aspects of the operations of 2105 may be performed by a key component as described with reference to FIGS. 8 through 11.

At 2110, the base station may receive a control message from a UE, where the control message includes one or more encrypted S-NSSAI values or an encrypted NSSAI value having an indication of one or more network slices accessible to the UE in wireless communication with the base station. The operations of 2110 may be performed according to the methods described herein. In some examples, aspects of the operations of 2110 may be performed by a message component as described with reference to FIGS. 8 through 11.

At 2115, the base station may decrypt the one or more encrypted S-NSSAI values or the encrypted NSSAI value in the control message using the security key. The operations of 2115 may be performed according to the methods described herein. In some examples, aspects of the operations of 2115 may be performed by a decryption component as described with reference to FIGS. 8 through 11.

Figure 22:
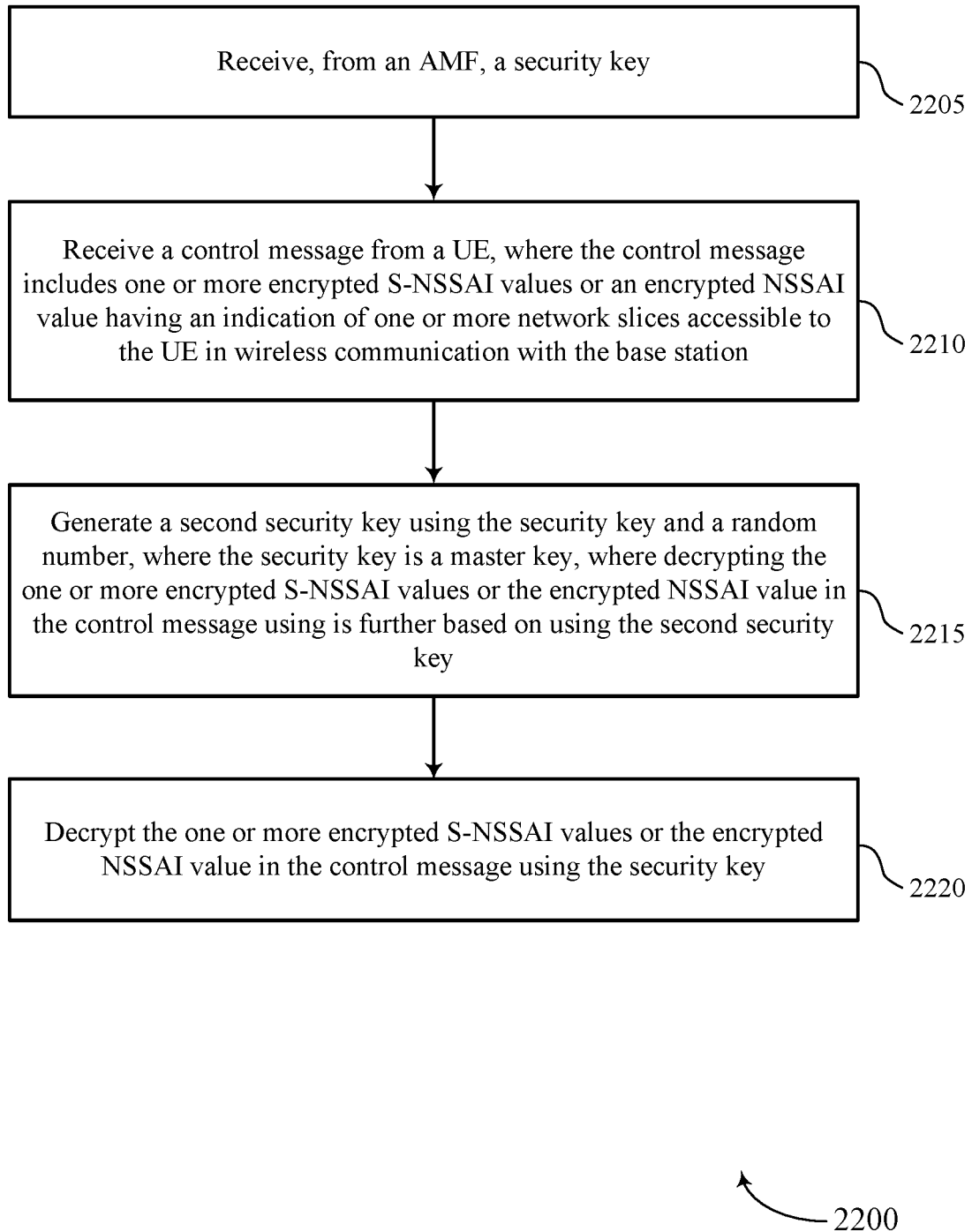

FIG. 22 shows a flowchart illustrating a method 2200 that supports encrypting NSSAI in accordance with aspects of the present disclosure. The operations of method 2200 may be implemented by a base station 105 or its components as described herein. For example, the operations of method 2200 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2205, the base station may receive, from an AMF, a security key. The operations of 2205 may be performed according to the methods described herein. In some examples, aspects of the operations of 2205 may be performed by a key component as described with reference to FIGS. 8 through 11.

At 2210, the base station may receive a control message from a UE, where the control message includes one or more encrypted S-NSSAI values or an encrypted NSSAI value having an indication of one or more network slices accessible to the UE in wireless communication with the base station. The operations of 2210 may be performed according to the methods described herein. In some examples, aspects of the operations of 2210 may be performed by a message component as described with reference to FIGS. 8 through 11.

At 2215, the base station may generate a second security key using the security key and a random number, where the security key is a master key, where decrypting the one or more encrypted S-NSSAI values or the encrypted NSSAI value in the control message using is further based on using the second security key. The operations of 2215 may be performed according to the methods described herein. In some examples, aspects of the operations of 2215 may be performed by a key component as described with reference to FIGS. 8 through 11.

At 2220, the base station may decrypt the one or more encrypted S-NSSAI values or the encrypted NSSAI value in the control message using the security key. The operations of 2220 may be performed according to the methods described herein. In some examples, aspects of the operations of 2220 may be performed by a decryption component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   participating in a registration procedure with an access and mobility management function;
   transmitting to the access and mobility management function, as part of the registration procedure, an indication of one or more single network slice selection assistance information or a network slice selection assistance information;
   receiving a control message from the access and mobility management function as part of the registration procedure, wherein the control message includes one or more encrypted single network slice selection assistance information values or an encrypted network slice selection assistance information value based at least in part on the indication; and
   transmitting, during a radio resource control (RRC) idle state with respect to a network device, the encrypted one or more single network slice selection assistance information values or the encrypted network slice assistance information value to the network device as part of a message.

2. The method of claim 1, wherein transmitting the one or more encrypted single network slice selection assistance information values or the encrypted network slice selection assistance information comprises:
transmitting the encrypted single network slice selection assistance information or the encrypted network slice selection assistance information without decrypting the encrypted single network slice selection assistance information or the encrypted network slice selection assistance information.

3. The method of claim 1, further comprising:
identifying in the control message an indication associating the one or more encrypted single network slice selection assistance information values or the encrypted network slice selection assistance information value with the UE, the indication comprising a set of bits in an encryption packet of the control message, the encryption packet including the one or more encrypted single network slice selection assistance information values or the encrypted network slice selection assistance information value, and wherein the set of bits comprises a random number.

4. The method of claim 3, wherein the random number comprises a UE identifier.

5. The method of claim 1, further comprising:
identifying in the control message an indication of a security key, an encryption function, or any combination thereof associated with encryption of the encrypted one or more single network slice selection assistance information values or the encrypted network slice selection assistance information value, wherein the indication comprises a set of bits in an encryption packet of the control message, the encryption packet including the encrypted one or more single network slice selection assistance information values or the encrypted network slice selection assistance information value.

6. The method of claim 1, wherein receiving the control message further comprises:
receiving, in the control message, a security key and a random number, wherein the security key is based at least in part on the random number and a master key known by the access and mobility management function and by the network device, the master key being associated with decrypting the one or more encrypted single network slice selection assistance information values or the encrypted network slice selection assistance information value.

7. The method of claim 6, further comprising:
adding additional network slice information to the one or more encrypted single network slice selection assistance information values or the encrypted network slice selection assistance information value; and
encrypting both the additional slice information and the one or more encrypted single network slice selection assistance information values or the encrypted network slice selection assistance information value into an expanded encryption packet using the security key, wherein transmitting the encrypted single network slice selection assistance information to the network device comprises transmitting the expanded encryption packet.

8. The method of claim 6, further comprising:
receiving new single network slice selection assistance information from the access and mobility management function;
encrypting the new single network slice selection assistance information using a second security key, wherein the UE receives the second key and a random number from the access and mobility management function; and
transmitting the encrypted new single network slice selection assistance information to the network device as part of a second control message, wherein the second control message includes the random number so that the network device is enabled to generate the second security key and decrypt the encrypted new single network slice selection assistance information.

9. The method of claim 8, further comprising:
identifying a global unique temporary identifier associated with a downlink transmission from the network device on the network slice, wherein the random number is based at least in part on the global unique temporary identifier.

10. A method for wireless communications at an access and mobility management function, comprising:
encrypting one or more single network slice selection assistance information values or a network slice selection assistance information value using a security key as part of a registration procedure with a user equipment (UE), wherein the one or more single network slice selection assistance information values or the network slice selection assistance information value comprises an indication of one or more network slices accessible to the UE;
transmitting, to the UE as part of the registration procedure while the UE is in a radio resource control (RRC) idle state with respect to a network device, a control message that includes the one or more encrypted single network slice selection assistance information values or the encrypted network slice selection assistance information value; and
transmitting the security key to the network device as part of the registration procedure so that the network device is enabled to decrypt the one or more encrypted single network slice selection assistance information values or the encrypted network slice selection assistance information value upon receipt from the UE.

11. The method of claim 10, wherein encrypting the one or more single network slice selection assistance information values or the encrypted network slice selection assistance information value comprises:
preparing an encryption packet that includes the one or more encrypted single network slice selection assistance information values or the encrypted network slice selection assistance information value, and an indication of the security key and an encryption function associated with the encrypting of the one or more single network slice selection assistance information values or the network slice selection assistance information value, wherein the indication comprises a set of bits in the encryption packet.

12. The method of claim 10, wherein encrypting the one or more single network slice selection assistance information values or the network slice selection assistance information value comprises:
preparing an encryption packet that includes the encrypted one or more single network slice selection assistance information values or the encrypted network slice selection assistance information value, and an indication associating the one or more encrypted single network slice selection assistance information or the encrypted network slice selection assistance information value with the UE, the indication comprising a set of bits in the encryption packet, and wherein the set of bits comprises a random number.

13. The method of claim 10, further comprising:
identifying a global unique temporary identifier associated with the UE, wherein the indication further comprises the global unique temporary identifier.

14. The method of claim 13, wherein encrypting the one or more single network slice selection assistance information values or the network slice selection assistance information value further comprises:
encrypting the one or more single network slice selection assistance information values or the network slice selection assistance information value using the global unique temporary identifier associated with the UE.

15. The method of claim 10, wherein the one or more encrypted single network slice selection assistance information values or the encrypted network slice selection assistance information value comprises a set of bits in an encryption packet included in the control message.

16. A method for wireless communications at a network device, comprising:
receiving, from an access and mobility management function as part of a registration procedure with a user equipment (UE), a security key;
receiving a control message from the UE as part of the registration procedure while the UE is in a radio resource control (RRC) idle state with respect to the network device, wherein the control message includes one or more encrypted single network slice selection assistance information values or an encrypted network slice selection assistance information value having an indication of one or more network slices accessible to the UE in wireless communication with the network device; and
decrypting the one or more encrypted single network slice selection assistance information values or the encrypted network slice selection assistance information value in the control message using the security key.

17. The method of claim 16, wherein the control message comprises a random number or a temporary identifier, or both.

18. The method of claim 16, further comprising:
generating a second security key using the security key and a random number, wherein the security key is a master key, wherein decrypting the one or more encrypted single network slice selection assistance information values or the encrypted network slice selection assistance information value in the control message using is further based at least in part on using the second security key.

19. The method of claim 16, further comprising:
identifying in the control message an indication of the security key and an encryption function associated with encryption of the one or more single network slice selection assistance information values or the encrypted network slice selection assistance information value, wherein the indication comprises a set of bits in an encryption packet of the control message, the encryption packet including the encrypted one or more single network slice selection assistance information values or the encrypted network slice selection assistance information value, and wherein decrypting the one or more encrypted single network slice selection assistance information values or the encrypted network slice selection assistance information value is further based at least in part on the indication of the security key and the encryption function.

20. The method of claim 16, further comprising:
identifying in the control message an indication associating the one or more encrypted single network slice selection assistance information values or the encrypted network slice selection assistance information value with the UE, the indication comprising a set of bits in an encryption packet of the control message, the encryption packet including the one or more encrypted single network slice selection assistance information values or the encrypted network slice selection assistance information value, and wherein the set of bits comprises a random number.

21. The method of claim 16, wherein decrypting the one or more encrypted single network slice selection assistance information values or the encrypted network slice selection assistance information value comprises:
decrypting an expanded encryption packet comprising both additional slice information and the one or more encrypted single network slice selection assistance information values or the encrypted network slice selection assistance information value using the security key, wherein receiving the one or more encrypted single network slice selection assistance information values or the encrypted network slice selection assistance information value from the UE comprises receiving the expanded encryption packet.

22. The method of claim 16, further comprising:
selecting one or more network slices for the UE based at least in part on the one or more encrypted single network slice selection assistance information values or the encrypted network slice selection assistance information value; and
transmitting a second indication of the selected network slices to the UE, the second indication comprising a global unique temporary identifier associated with the UE.

23. The method of claim 16, further comprising:
receiving a second control message including one or more encrypted new single network slice selection assistance information values from the UE, wherein the second control message includes a security key refresh value associated with decrypting the encrypted new single network slice selection assistance information.

24. An apparatus for wireless communications, comprising: a processor, memory in electronic communication with the processor; and instructions stored in the memory and executable by the processor to cause the apparatus to:
participate in a registration procedure with an access and mobility management function;
transmit to the access and mobility management function, as part of the registration procedure, an indication of one or more single network slice selection assistance information or a network slice selection assistance information;
receive a control message from the access and mobility management function as part of the registration procedure, wherein the control message includes one or more encrypted single network slice selection assistance information values or an encrypted network slice selection assistance information value based at least in part on the indication; and transmit, during a radio resource control (RRC) idle state with respect to a network device, the encrypted single network slice selection assistance information or the encrypted network slice assistance information to a network device as part of a message.

25. The apparatus of claim 24, wherein the instructions to transmit the one or more encrypted single network slice selection assistance information values or the encrypted network slice selection assistance information are executable by the processor to cause the apparatus to:
  transmit the encrypted single network slice selection assistance information or the encrypted network slice selection assistance information without decrypting the encrypted single network slice selection assistance information or the encrypted network slice selection assistance information.

26. The apparatus of claim 24, wherein the instructions are further executable by the processor to cause the apparatus to:
  identify in the control message an indication associating the one or more encrypted single network slice selection assistance information values or the encrypted network slice selection assistance information value with the apparatus, the indication comprising a set of bits in an encryption packet of the control message, the encryption packet including the one or more encrypted single network slice selection assistance information values or the encrypted network slice selection assistance information value, and wherein the set of bits comprises a random number.

27. The apparatus of claim 24, wherein the instructions are further executable by the processor to cause the apparatus to:
  identify in the control message an indication of a security key and an encryption function associated with encryption of the encrypted one or more single network slice selection assistance information values or the encrypted network slice selection assistance information value, wherein the indication comprises a set of bits in an encryption packet of the control message, the encryption packet including the encrypted one or more single network slice selection assistance information values or the encrypted network slice selection assistance information value.

28. The apparatus of claim 24, wherein the instructions to receive the control message further are executable by the processor to cause the apparatus to:
  receive, in the control message, a security key and a random number, wherein the security key is based at least in part on the random number and a master key known by the access and mobility management function and by the network device, the master key being associated with decrypting the one or more encrypted single network slice selection assistance information values or the encrypted network slice selection assistance information value.

29. The apparatus of claim 28, wherein the instructions are further executable by the processor to cause the apparatus to:
  add additional network slice information to the one or more encrypted single network slice selection assistance information values or the encrypted network slice selection assistance information value; and
  encrypt both the additional slice information and the one or more encrypted single network slice selection assistance information values or the encrypted network slice selection assistance information value into an expanded encryption packet using the security key, wherein transmitting the encrypted single network slice selection assistance information to the network device are executable by the processor to cause the apparatus to transmit the expanded encryption packet.

30. The apparatus of claim 28, further comprising:
  receiving new single network slice selection assistance information from the access and mobility management function;
  encrypting the new single network slice selection assistance information using a second security key, wherein a user equipment (UE) receives the second key and a random number from the access and mobility management function; and
  transmitting the encrypted new single network slice selection assistance information to the network device as part of a second control message, wherein the second control message includes the random number so that the network device is enabled to generate the second security key and decrypt the encrypted new single network slice selection assistance information.

* * * * *